Oct. 18, 1955  A. NOVICK ET AL  2,720,830
MACHINE FOR PRINTING ADDRESSES FROM CARDS
Filed Dec. 14, 1950
26 Sheets-Sheet 1

INVENTORS
Abraham Novick and
William M. Foster

BY Moser, Nolte, Crews & Berry
ATTORNEYS

Oct. 18, 1955 A. NOVICK ET AL 2,720,830
MACHINE FOR PRINTING ADDRESSES FROM CARDS
Filed Dec. 14, 1950 26 Sheets-Sheet 2

INVENTORS
Abraham Novick and
William M. Foster

BY Moses, Nolte, Crews & Berry
ATTORNEYS

Oct. 18, 1955 A. NOVICK ET AL 2,720,830
MACHINE FOR PRINTING ADDRESSES FROM CARDS
Filed Dec. 14, 1950 26 Sheets-Sheet 5

INVENTORS
Abraham Novick and
William M. Foster
BY Moses, Nolte, Crew + Berry
ATTORNEYS INVENTORS
Abraham Novick and
William M. Foster BY Moses, Nolte, Crews & Berry
ATTORNEYS Oct. 18, 1955

A. NOVICK ET AL 2,720,830

MACHINE FOR PRINTING ADDRESSES FROM CARDS

Filed Dec. 14, 1950

INVENTORS
Abraham Novick and
William M. Foster

BY Moses, Nolte, Crews + Berry
ATTORNEYS

Oct. 18, 1955     A. NOVICK ET AL     2,720,830
MACHINE FOR PRINTING ADDRESSES FROM CARDS
Filed Dec. 14, 1950     26 Sheets-Sheet 10

INVENTORS
Abraham Novick and
William M. Foster

BY Moser, Nolte, Cruse & Berry
ATTORNEYS

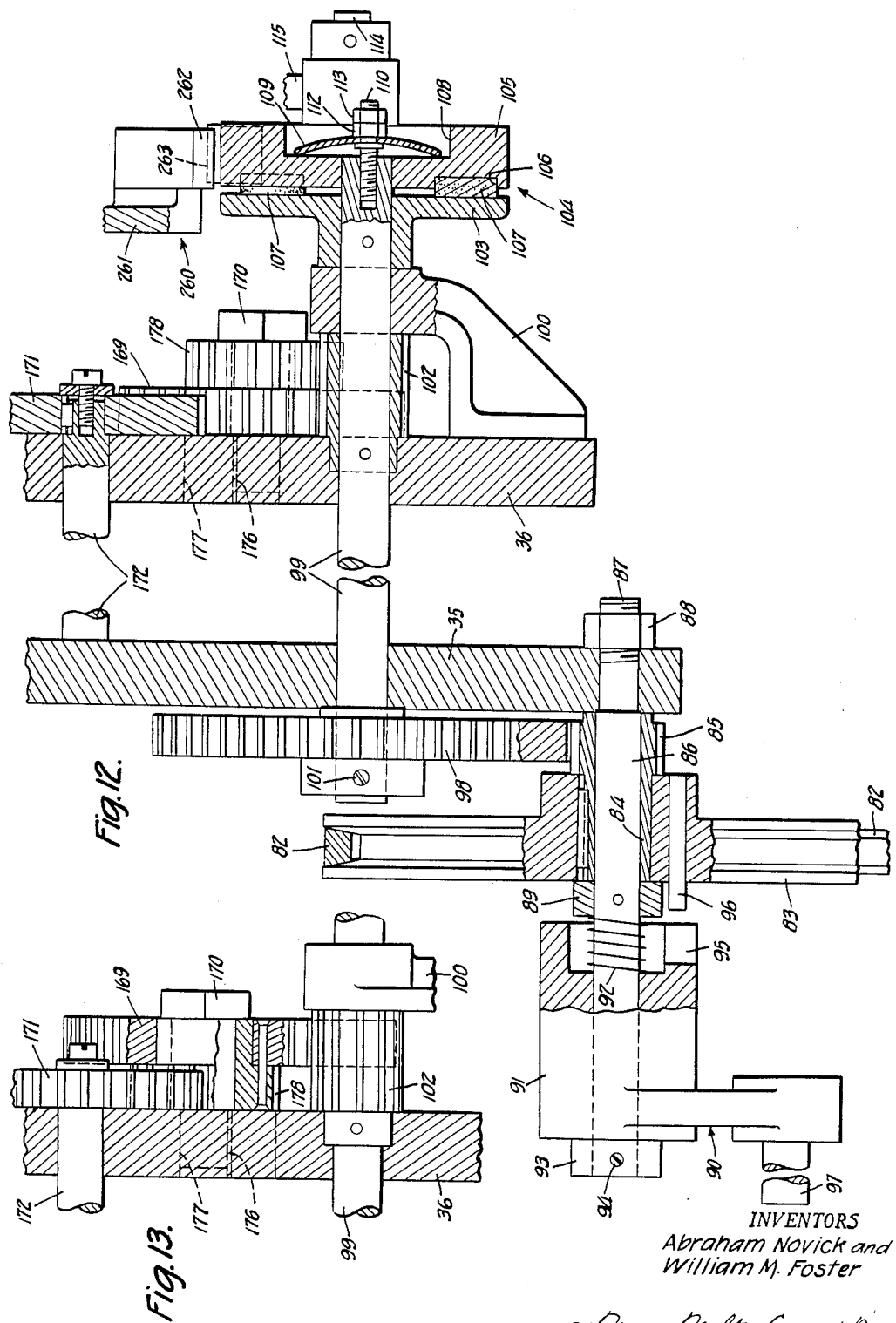

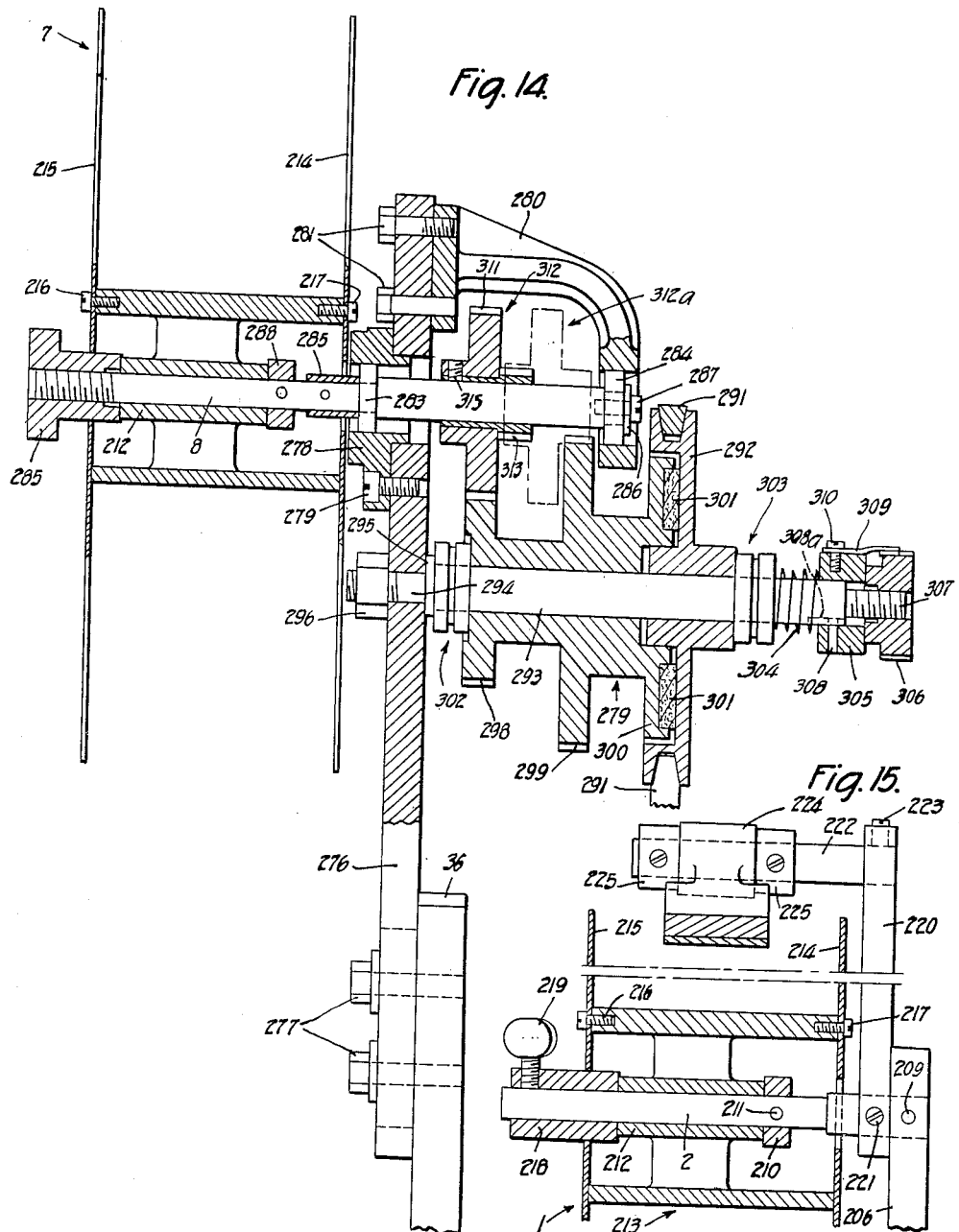

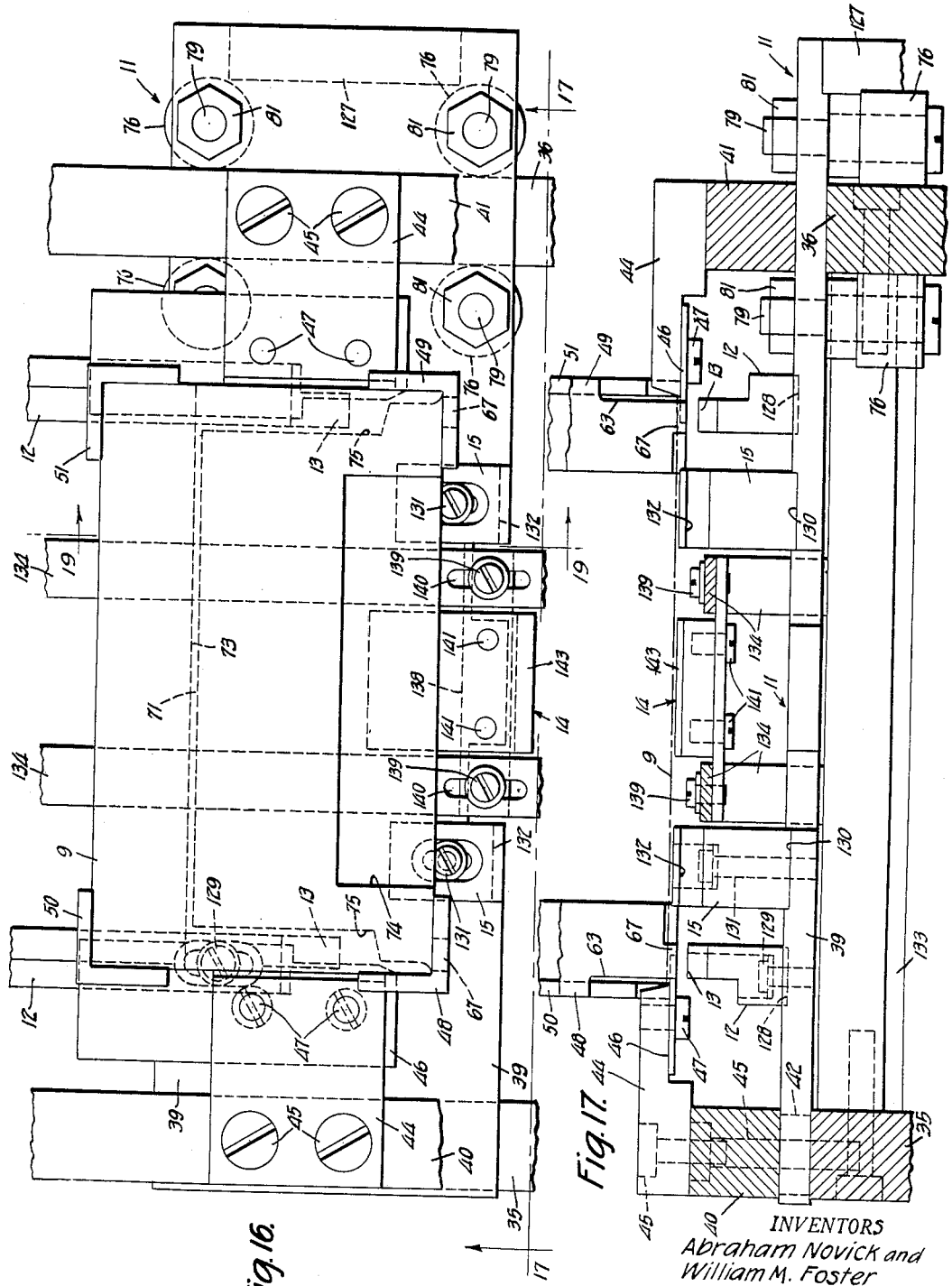

INVENTORS
Abraham Novick and
William M. Foster

BY Moser, Nolte, Crews & Berry
ATTORNEYS

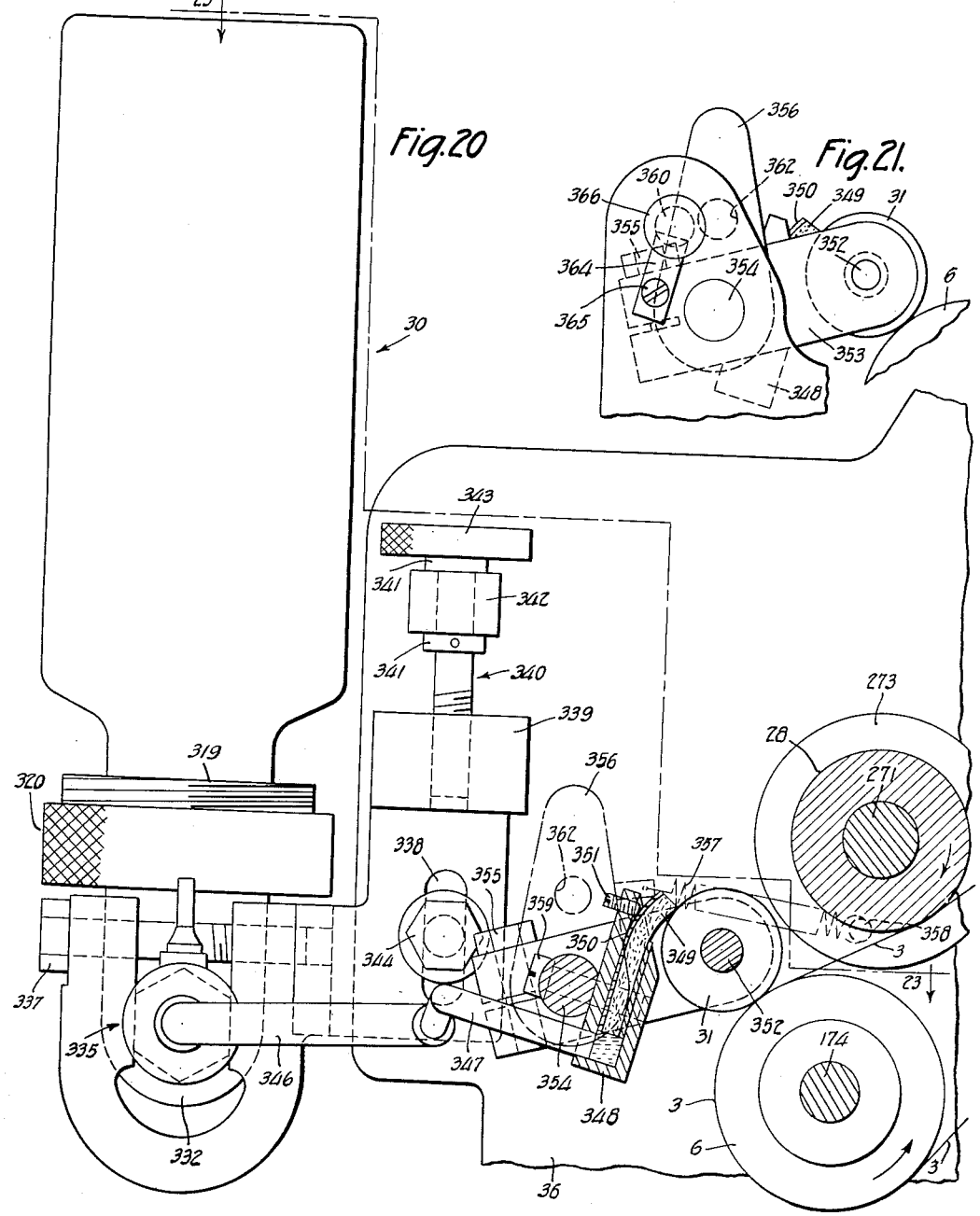

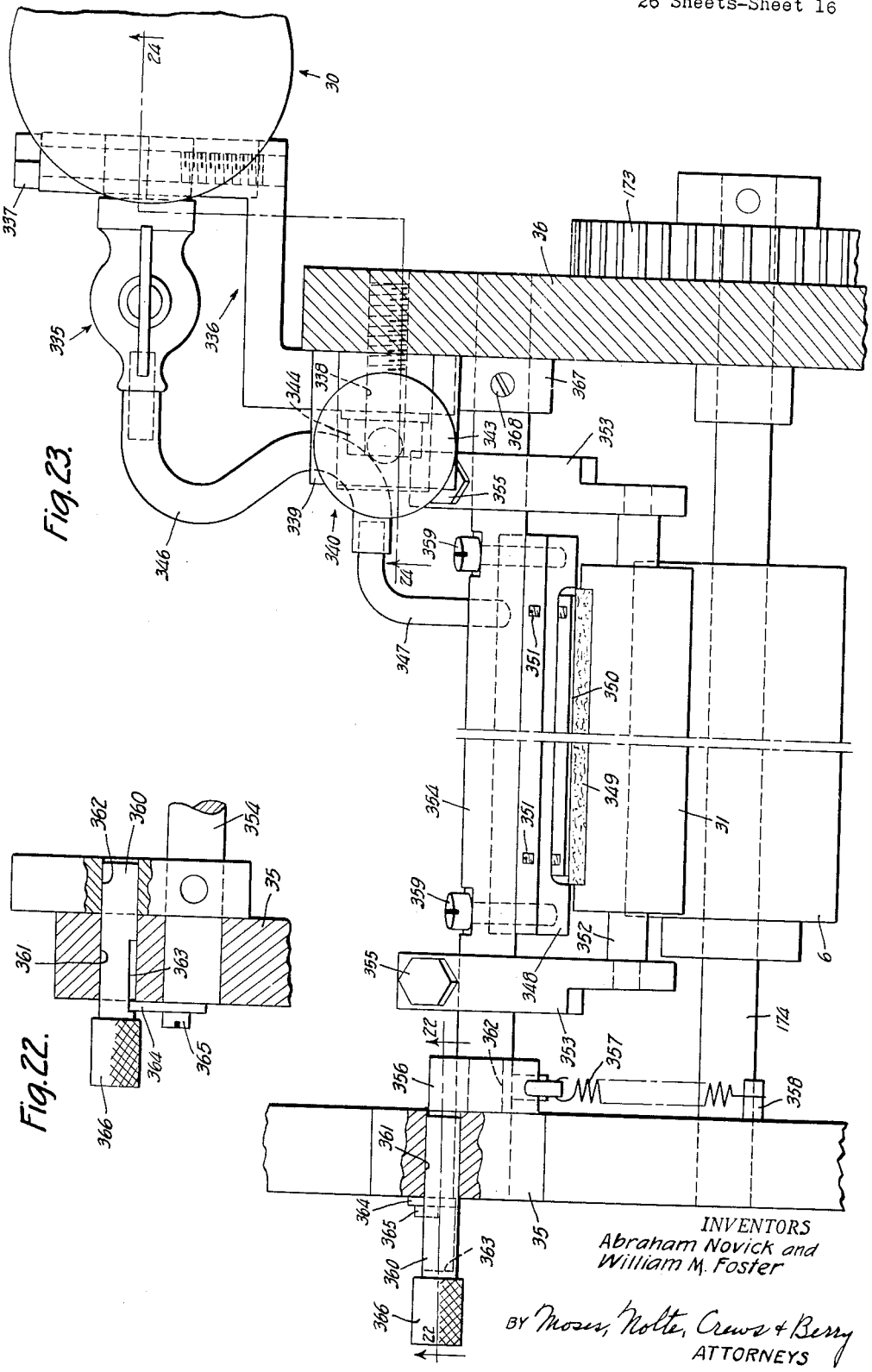

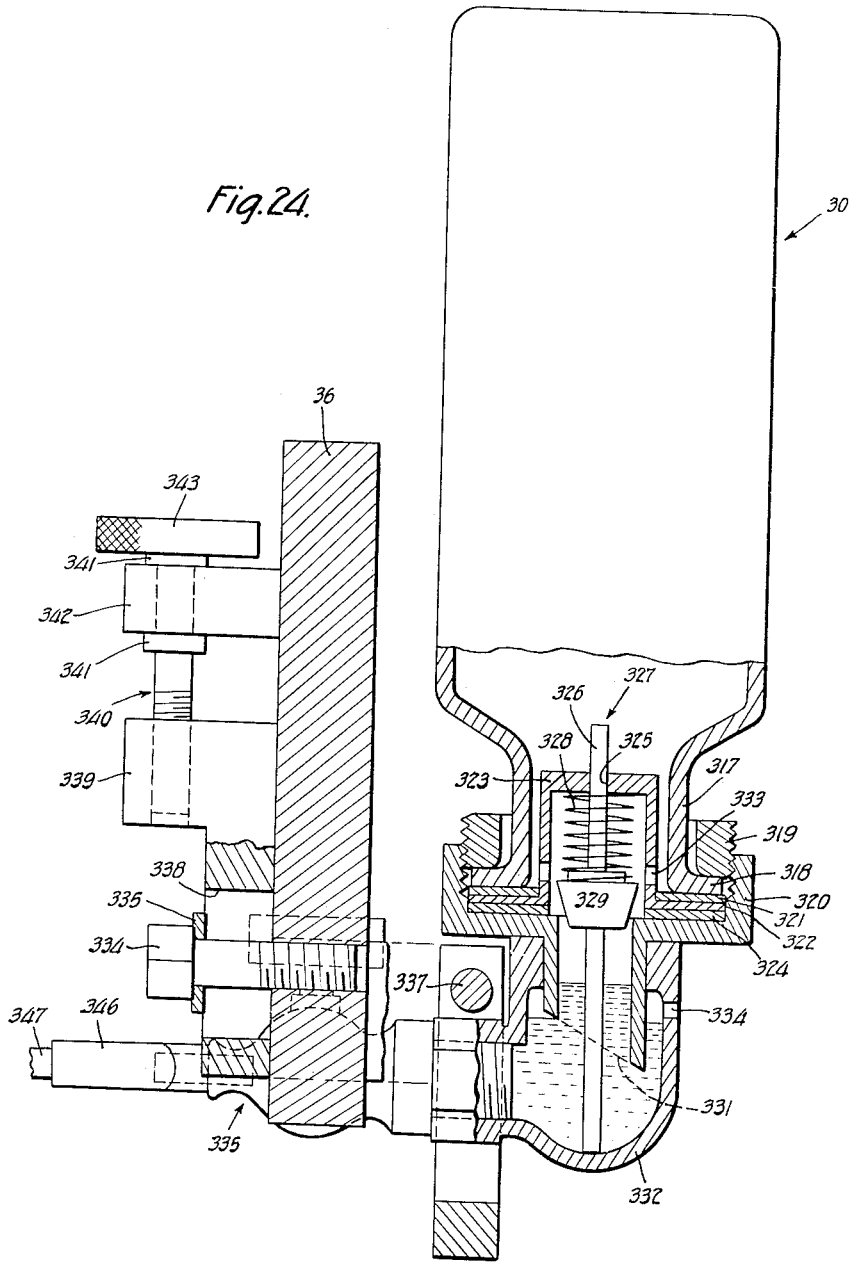

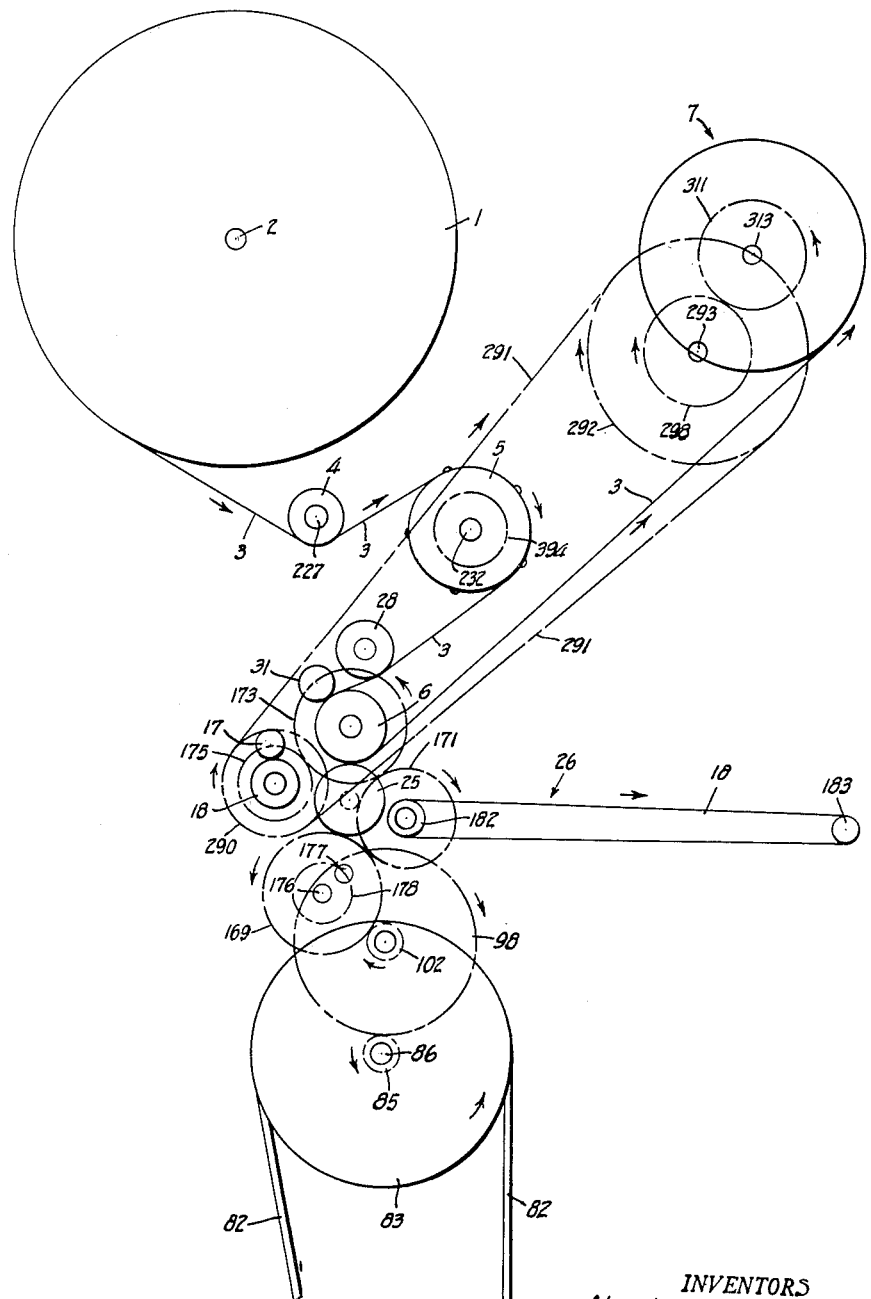

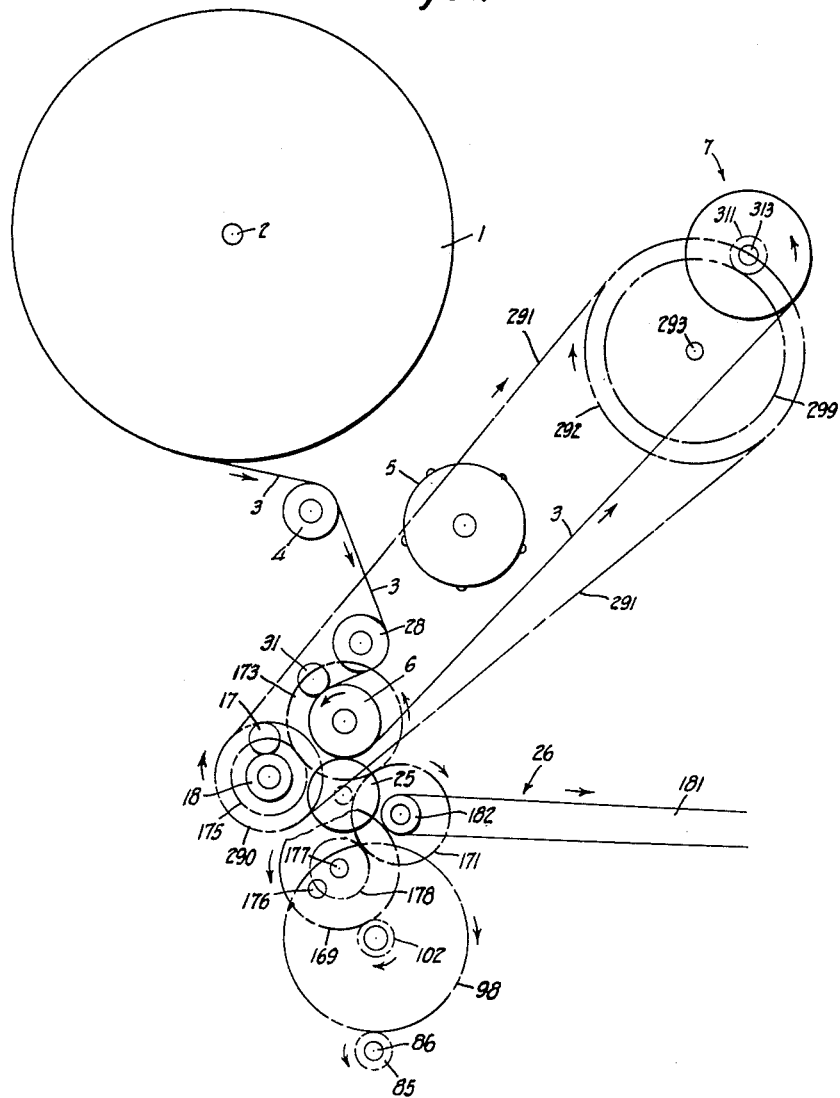

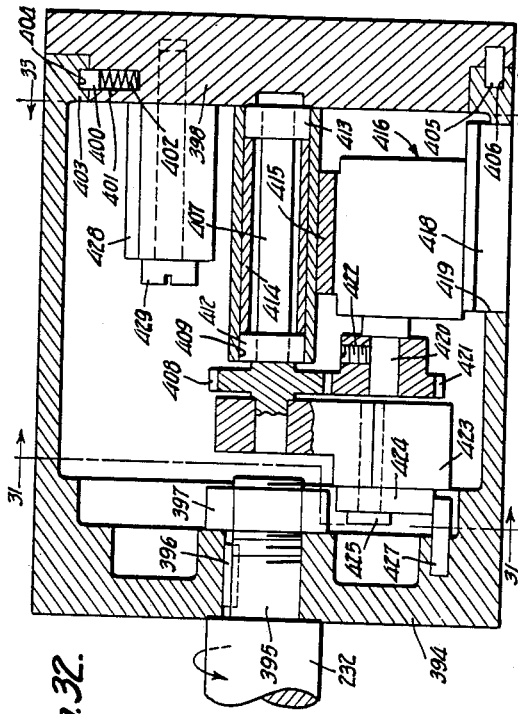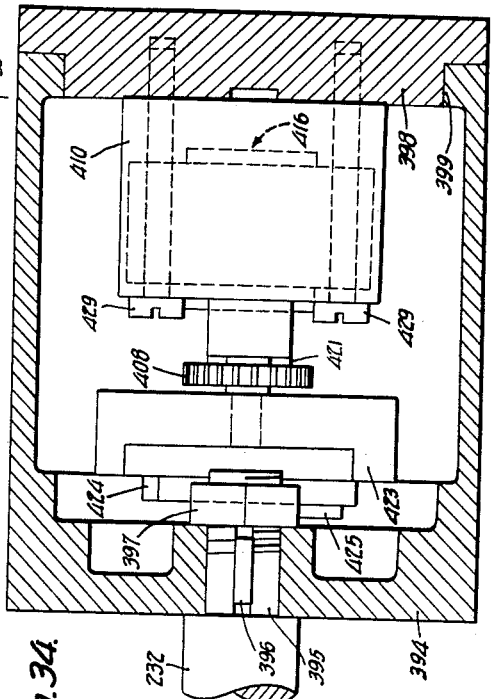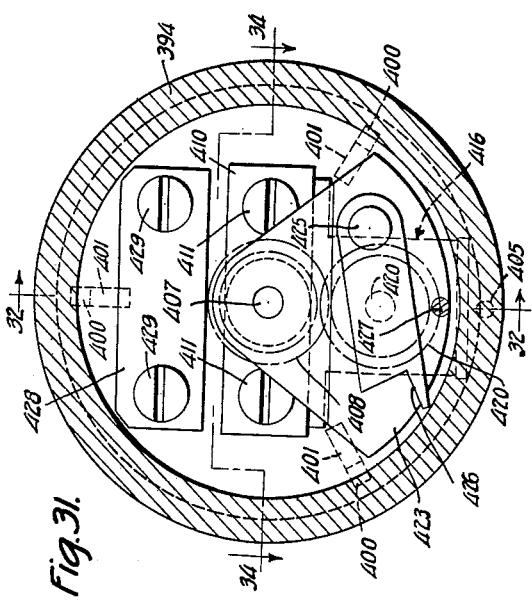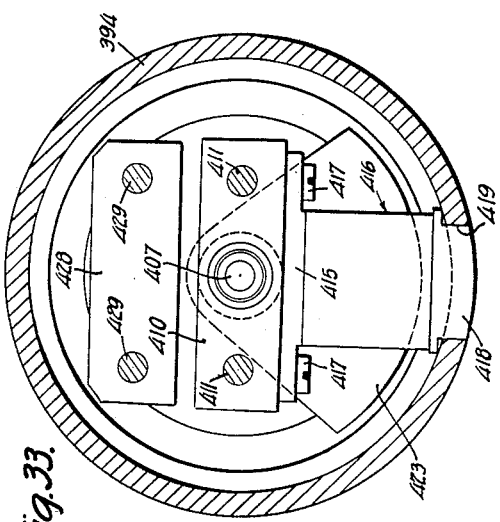

Oct. 18, 1955
A. NOVICK ET AL
2,720,830
MACHINE FOR PRINTING ADDRESSES FROM CARDS
Filed Dec. 14, 1950
26 Sheets-Sheet 22
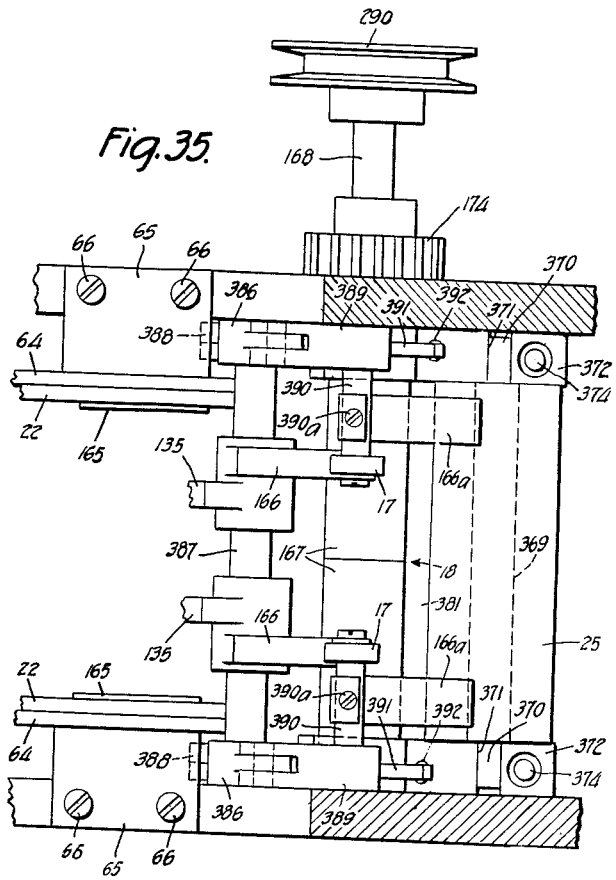
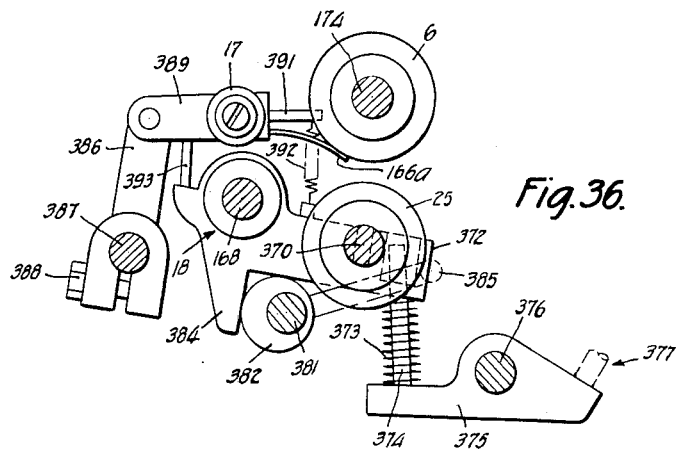
INVENTORS
Abraham Novick and
William M. Foster
BY Moser, Nolte, Crews & Berry
ATTORNEYS Oct. 18, 1955    A. NOVICK ET AL    2,720,830
MACHINE FOR PRINTING ADDRESSES FROM CARDS
Filed Dec. 14, 1950    26 Sheets-Sheet 23
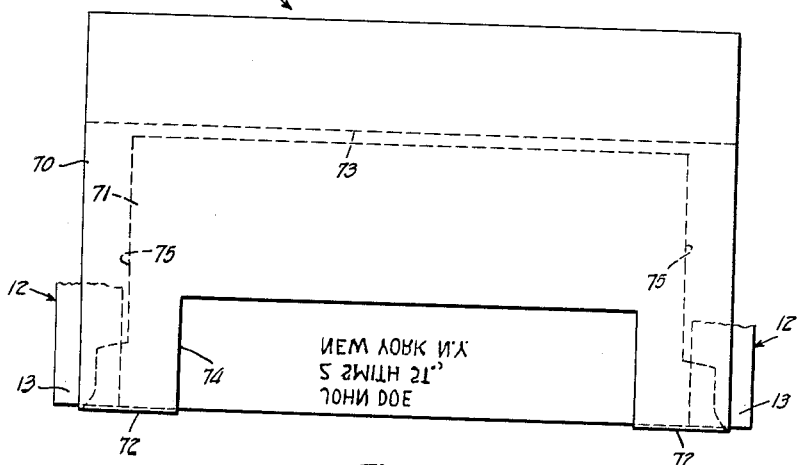
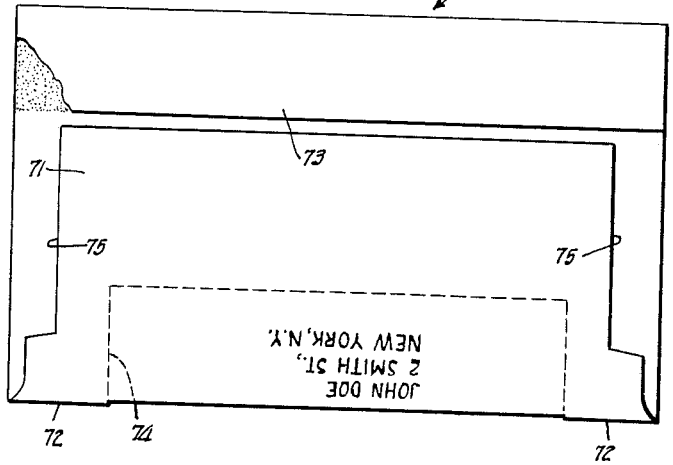
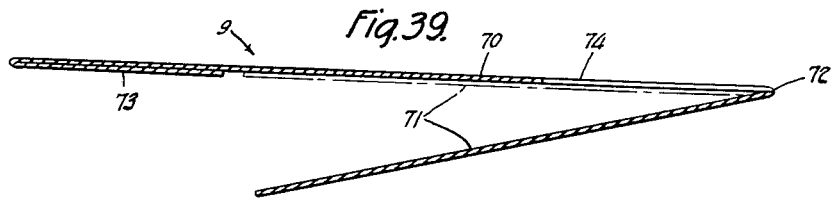
INVENTORS
Abraham Novick and
William M. Foster
BY Moses, Nolte, Crews + Berry
ATTORNEYS

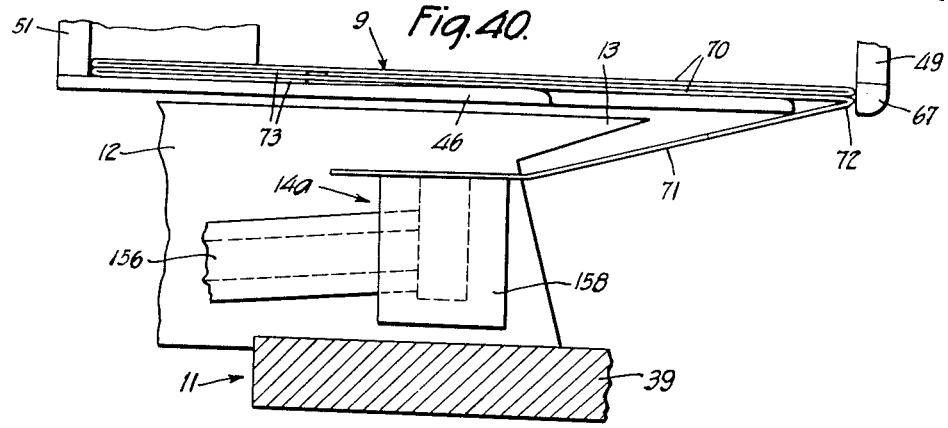
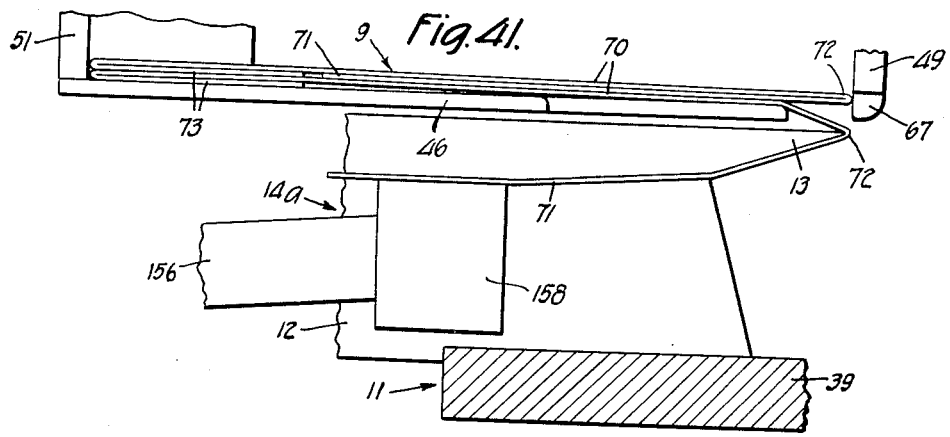
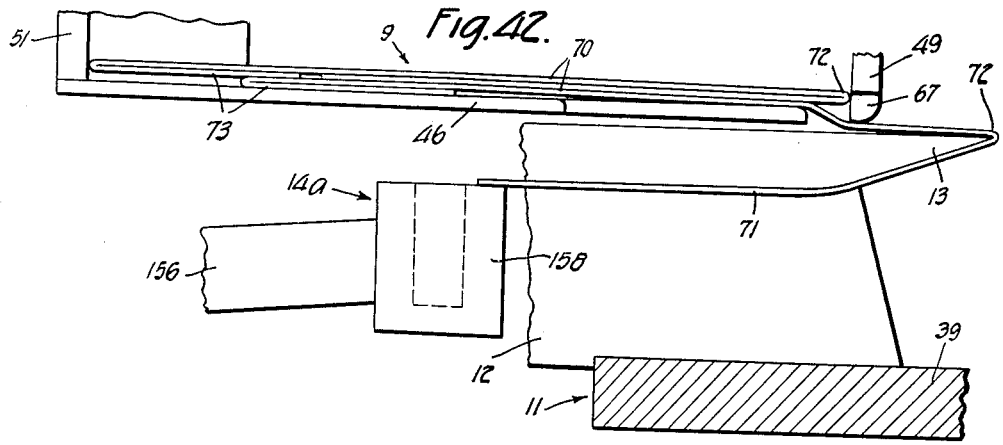

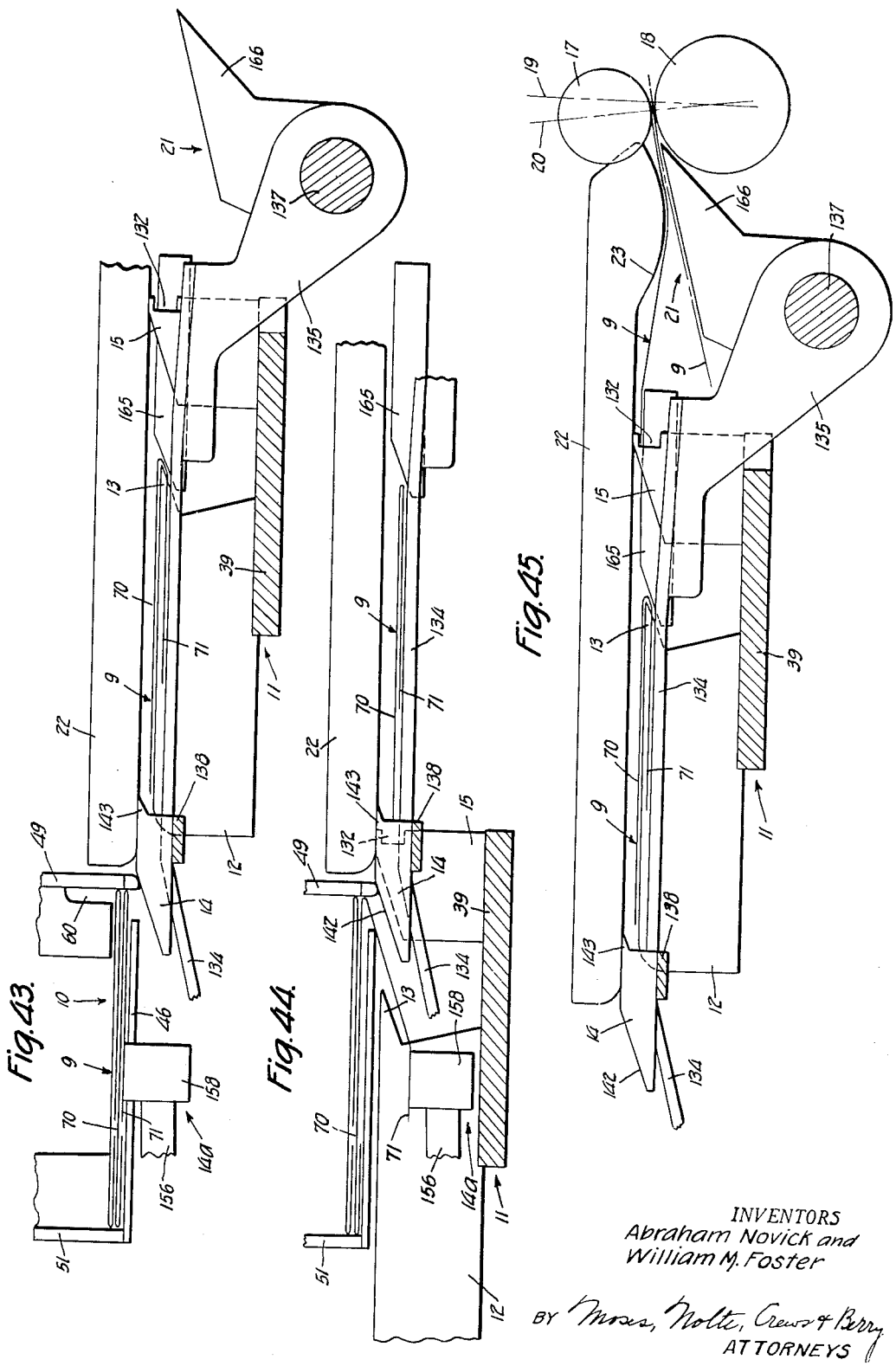

Oct. 18, 1955

A. NOVICK ET AL 2,720,830

MACHINE FOR PRINTING ADDRESSES FROM CARDS

Filed Dec. 14, 1950

INVENTORS
Abraham Novick and
William M. Foster

BY Moses, Nolte, Crews & Berry
ATTORNEYS

United States Patent Office 2,720,830
Patented Oct. 18, 1955

2,720,830

MACHINE FOR PRINTING ADDRESSES FROM CARDS

Abraham Novick, Flushing, and William M. Foster, Queens Village, N. Y., assignors to F. L. Smithe Machine Co., Inc., New York, N. Y., a corporation of New York Application December 14, 1950, Serial No. 200,842

9 Claims. (Cl. 101—52)

This invention relates to mechanism for printing addresses onto a web from folded flexible cards. The resulting web is intended to be cut into individual slips or patches which may be adhesively applied to envelopes, mailing wrappers, periodicals and the like.

While certain features of the invention are useful for other purposes than the illustrative one referred to, the improvements have been devised with the illustrative use primarily in view, and it is that use which will be primarily stressed.

The printing cards employed desirably comprise upper and lower folds. Each upper fold is provided with a cutout near its forward end through which an address printed in hectographing ink is exposed. Each lower fold has its end margin notched to make the lower fold narrower than the upper. The notches extend forward from the rear extremities of the lower folds throughout the greater portion of the widths of such folds and terminate only a short distance behind the fold line at the forward extremity of the card. A stack of these cards is set in a magazine having side supporting ledges so spaced from one another that the lower fold of the bottom-most card is free to drop down between the ledges.

It is an important object of the present invention to transfer the addresses from the cards onto the web one after another, preferably with an accurately predetermined length of web allotted to each address so that the web may later be severed along predetermined lines to be divided into slips of uniform length with assurance that one complete address will appear upon each slip. In order that this result may be attained it is necessary that the web and cards be advanced in accurately timed relation.

One requirement which has to be met is that the cards shall be detached and fed forward from the stack one by one without disturbing or disarranging the following cards. To this end novel card feeding mechanism is provided. The cards are supported on ledges with the lower fold of the bottommost card free to drop below the ledges. Obstructing guides are provided at the forward corners of the stack, and these guides extend below the ledges so that the cards cannot be accidentally dislodged. A reciprocating carriage is provided for the wedges which travel beneath the ledges, enter the folded card, and exert a camming action upon the lower fold to force the leading folded edge downward clear of the obstructing guides.

It is a further feature of the invention that mechanism is provided for catching and detaining each card against retrograde movement when it comes to rest at the conclusion of a forward step of the carriage. For this purpose, a stationary stop is provided, located between the paths of the wedges and having a sloping rear face which raises the intermediate portion of the card above the wedges, causing it to be bowed upward and hence to snap down in front of the stop as soon as it is moved forward far enough to clear the stop.

It is a further feature of the invention that the carriage includes a pusher engageable with the rear edge of a card for advancing the card through a second step to mechanism which rearranges the individual cards into overlapped relation.

It is a further feature that the mechanism for rearranging the cards into overlapped relation comprises the pusher just referred to, which reciprocates in a prescribed path, in combination with a feed roller couple having its line of centers tilted slightly relative to said path for giving the cards an upward tilt, an inclined card supporting shelf leading into the bight of the feed rollers in a plane tangent to both of them, and a cam which extends from above down across the card path to depress each card onto the card which precedes it as it moves toward the bight of the feed roller couple.

It is a further feature of the invention that provision is made of a sucker beneath the stack, together with operating mechanism therefor timed to press the sucker upward against the stack through the lower fold of each freshly exposed card and to swing the fold down away from the stack after the wedges have been retracted far enough to escape engagement with said fold and before they have been again advanced to their fold engaging positions.

It is a further feature of the invention that the web, though frictionally fed, itself operates positively actuating mechanism for timing the cyclically acting card feeding carriage to compel a card feeding cycle to be initiated only after a prescribed length of web has been fed. With this arrangement, the correct spacing of the addresses on the web is assured even though the web may slip or creep relative to the web feeding mechanism.

In order to secure the above referred to timing of the card feeding and the web feeding, the card feeding carriage is arranged to be driven through a friction clutch. When a card feeding cycle is completed before the prescribed length of web has been fed, a stop becomes effective to prevent the initiation of a new card feeding cycle. The stop is controlled from a pin wheel having pins which fit into web perforations. The travel of the pin wheel is an exact measure of the travel of the web and may be utilized to compel a card feeding cycle to be initiated precisely at a prescribed point with respect to the web feeding.

It is not essential that the timing of the card feeding cycle be corrected for each cycle so long as correction is made often enough to assure no objectionable accumulation of error. In some forms of the invention, therefore, provision is made for correcting the timing of the card feeding mechanism only after a plurality of card feeding cycles have been executed.

It is a further feature of the invention that the machine is made to include change speed mechanism for altering the rate of web feed relative to the frequency of card supply so that different predetermined spacings of the addresses on the web may be obtained.

It is still another feature of the invention that a counter is provided which cannot be tampered with for measuring and indicating the amount of web fed.

It is a still further feature that the machine is so constructed and arranged that the web may be trained to bypass the pin wheel, and hence to render inoperative the automatic control mechanism through which the card feeding carriage is timed relative to the web. This is desirable for relatively crude work when slips are wanted which will merely be severed manually or severed under manual control. Precision of spacing is only required when the web bearing addresses is fed to automatic machinery which severs the slips at uniform, mechanically determined intervals.

Other objects and advantages will hereinafter appear.

In the drawing forming part of this specification:

Figure 1:
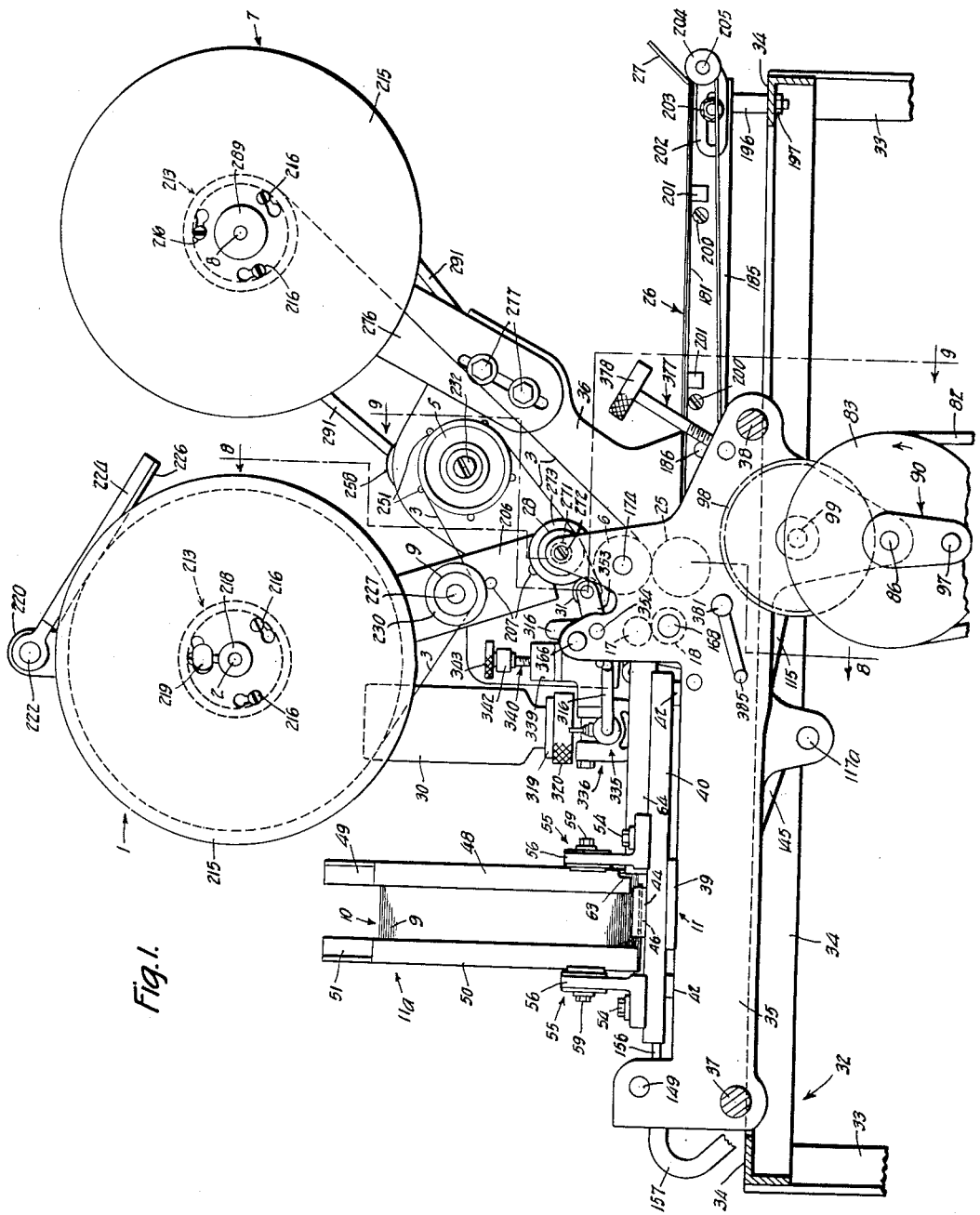
Figure 1 is a fragmentary view in front elevation, partly in section, illustrating a machine which embodies features of the invention.
Figure 2:
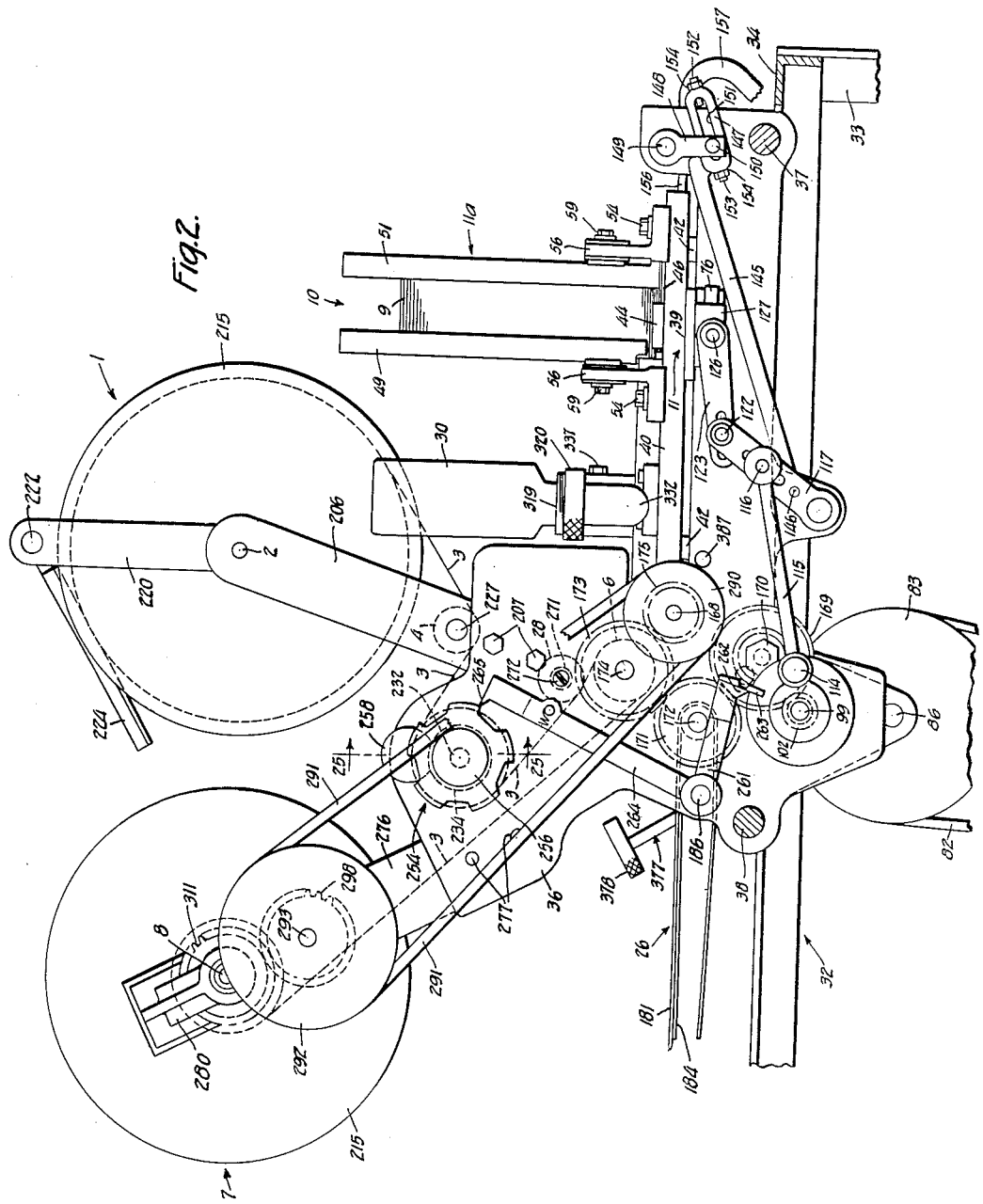
Figure 2 is a fragmentary view in rear elevation, partly in section, of the machine shown in Figure 1.
Figure 3:
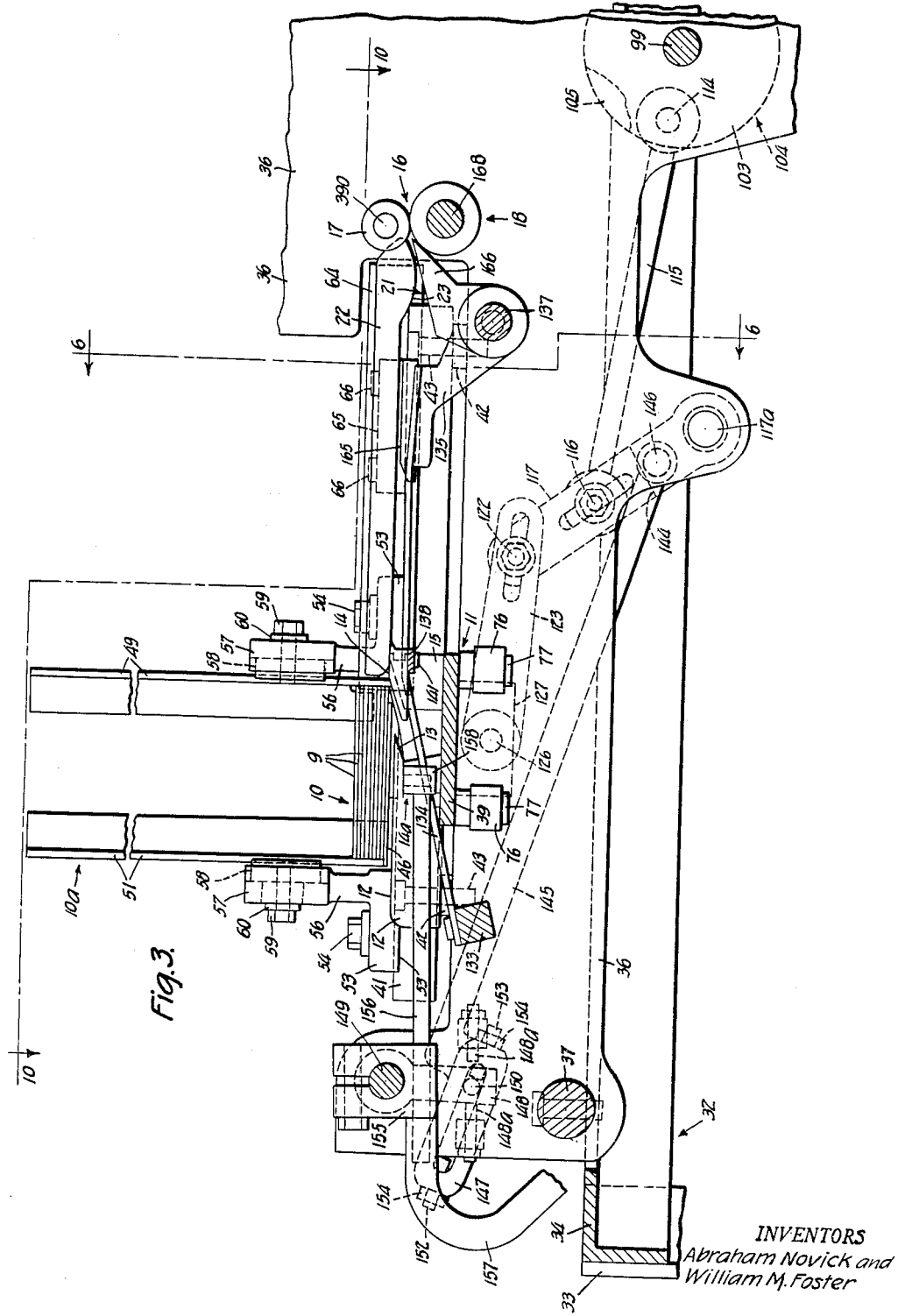
Figure 4:
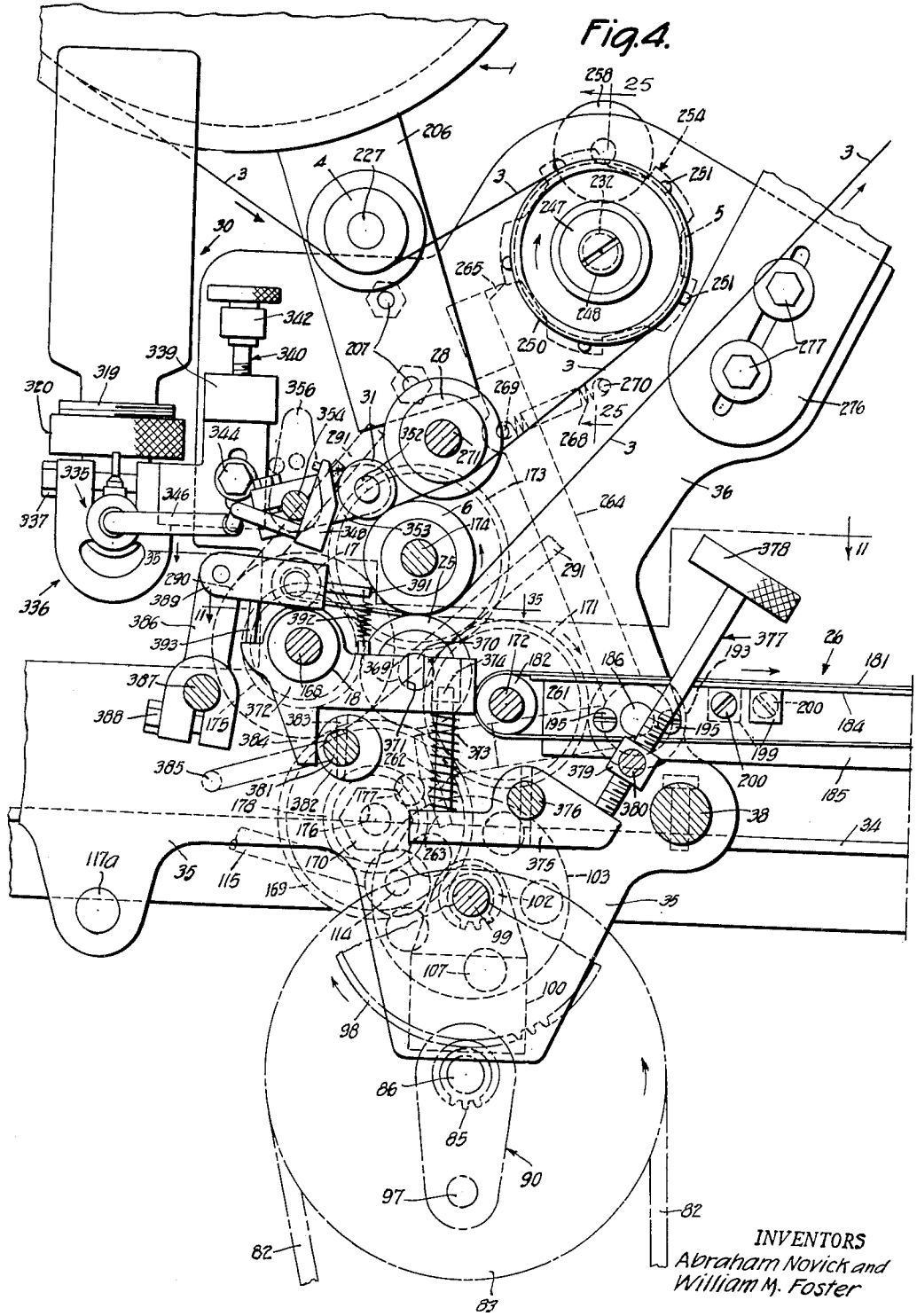
Figure 5:
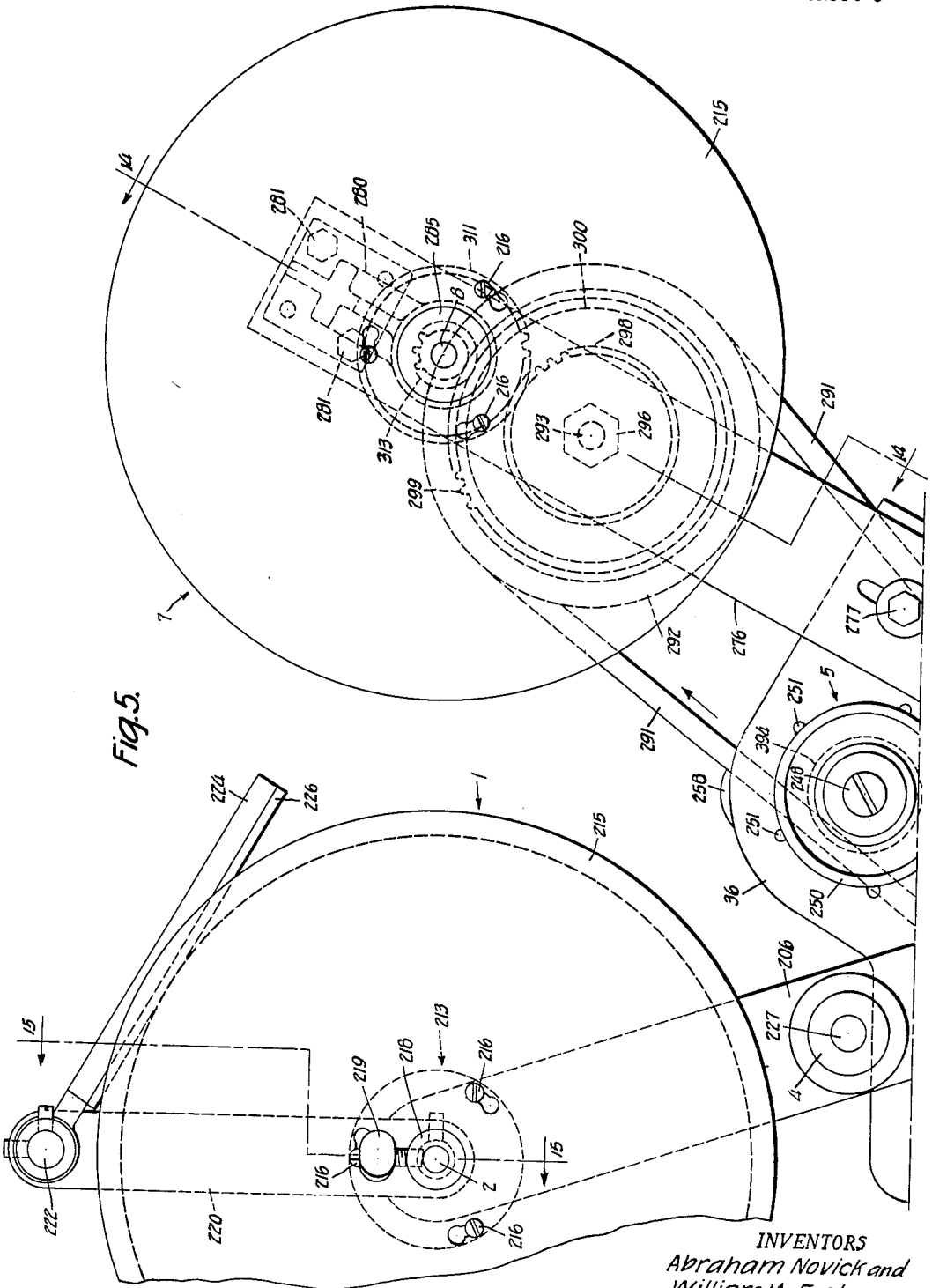
Figure 6:
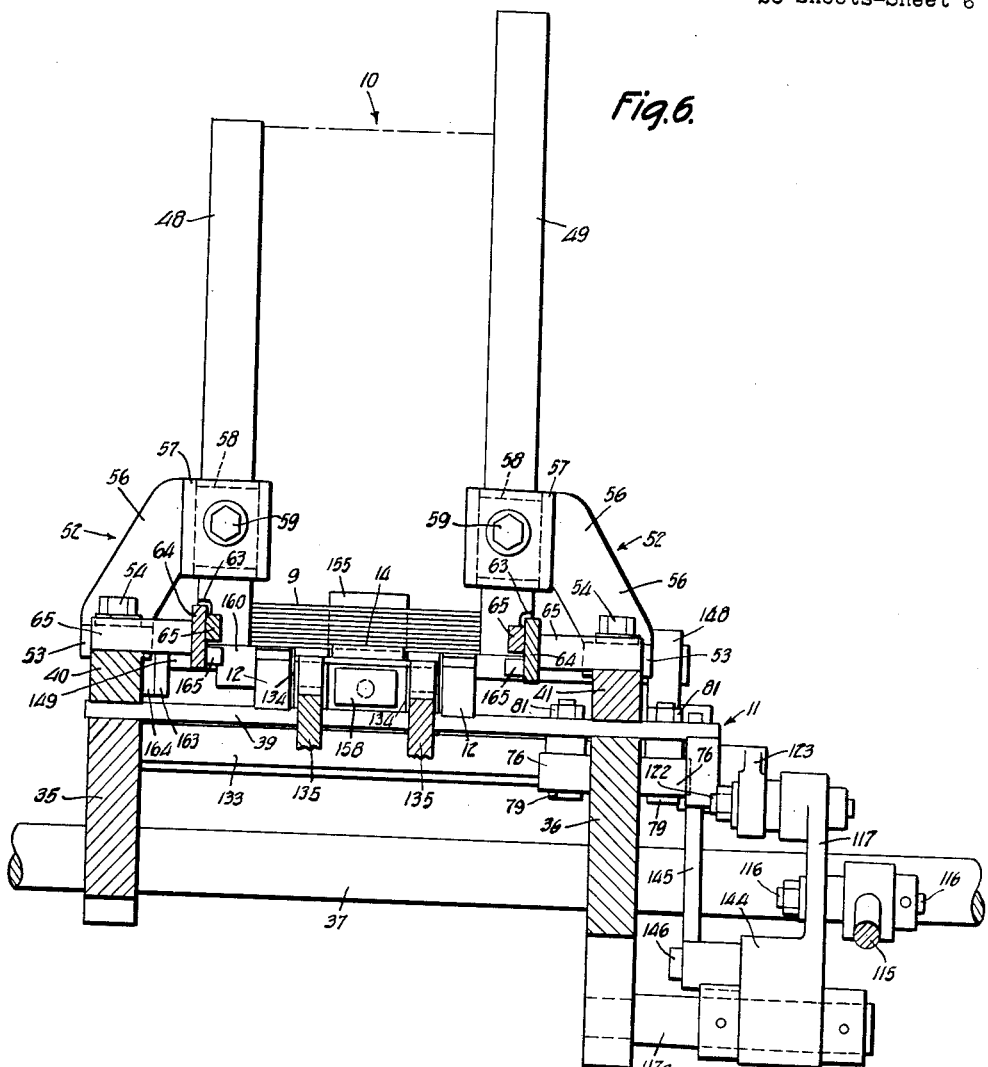
Figure 7:
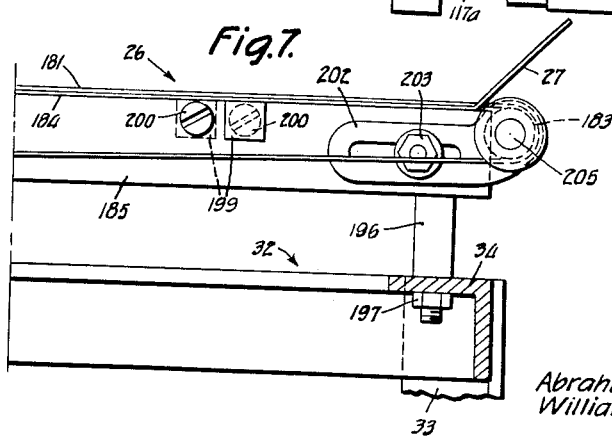
Figure 8:
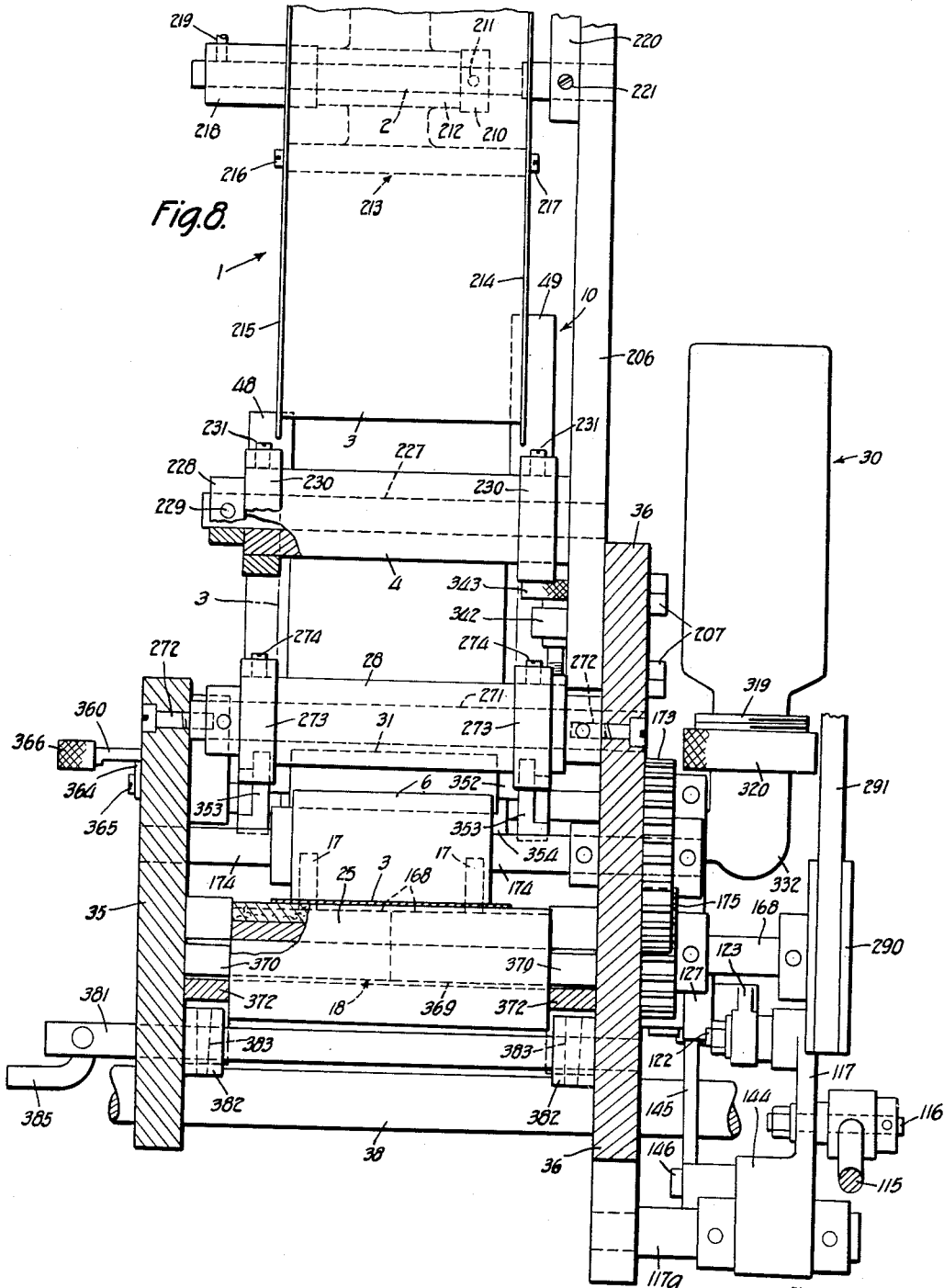
Figure 9:
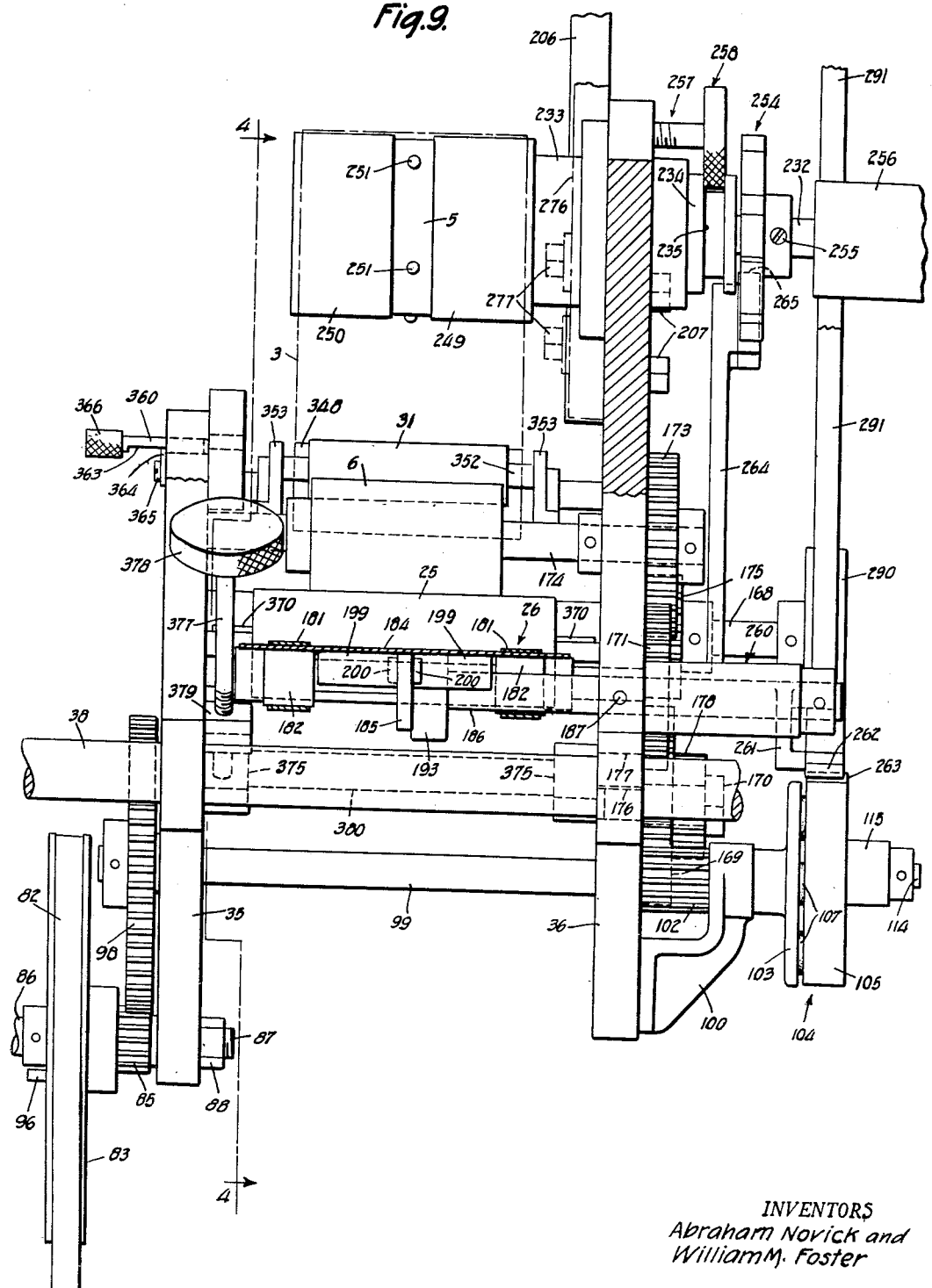
Figure 10:
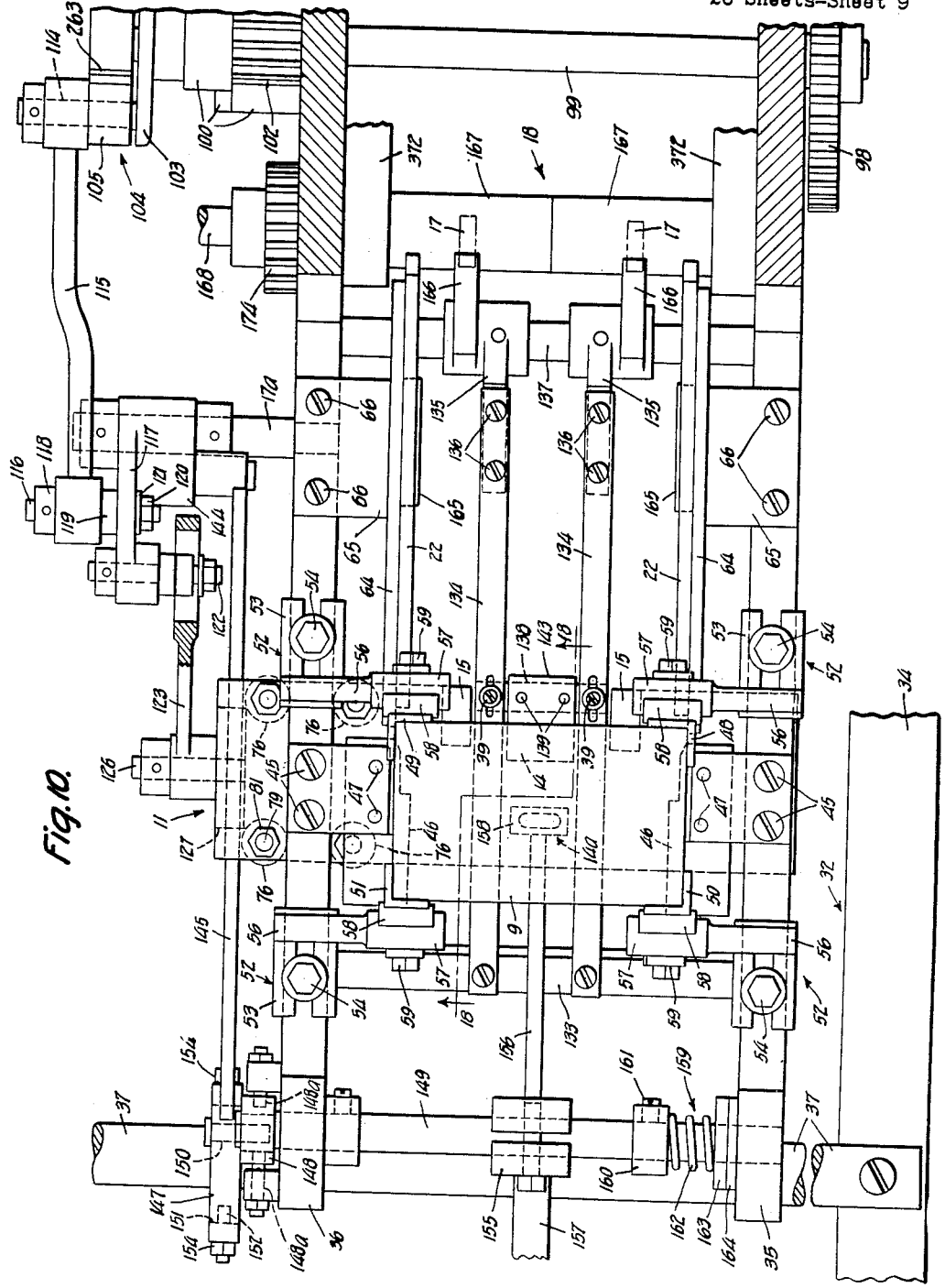
Figure 11:
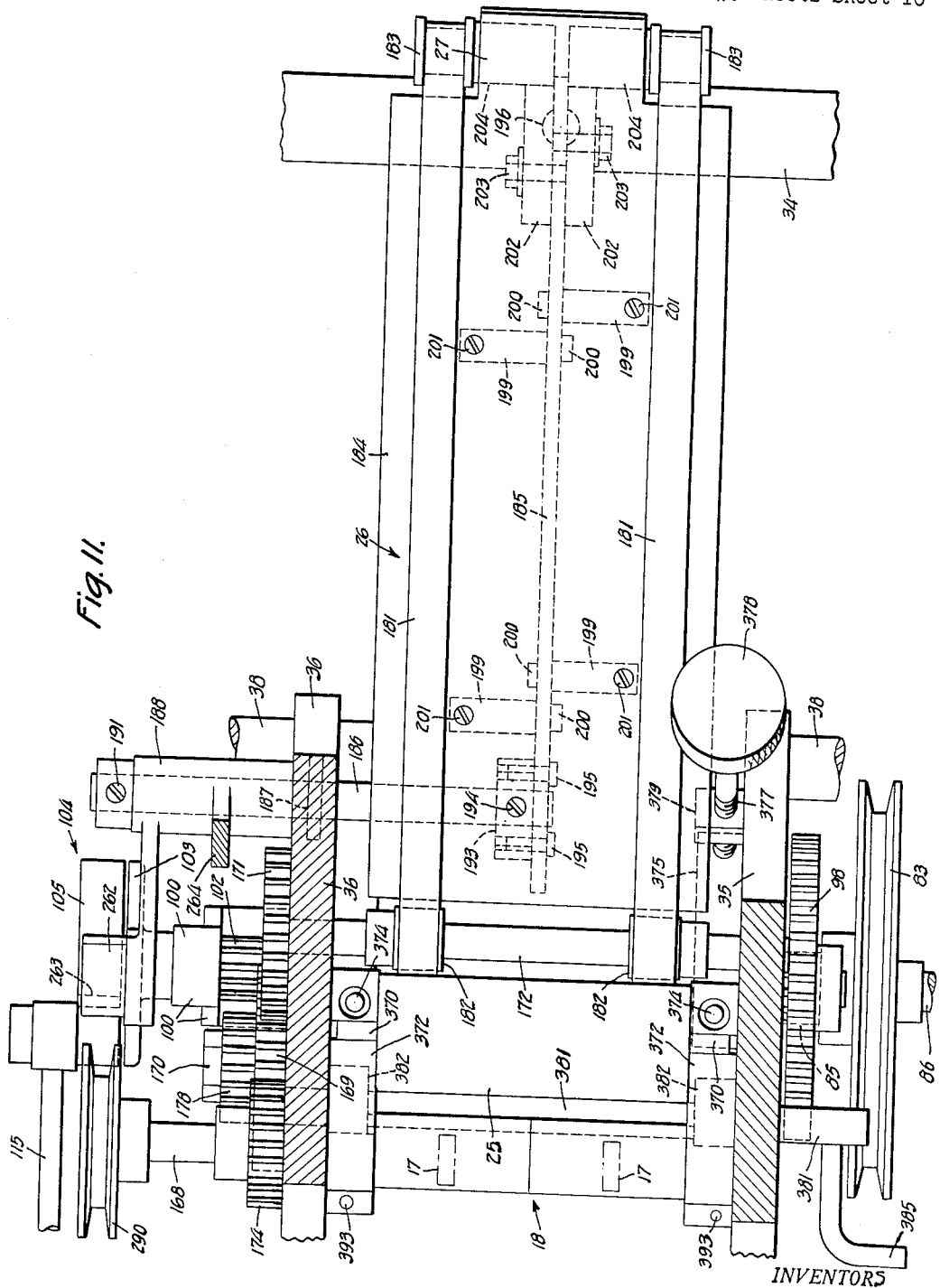
Figure 18:
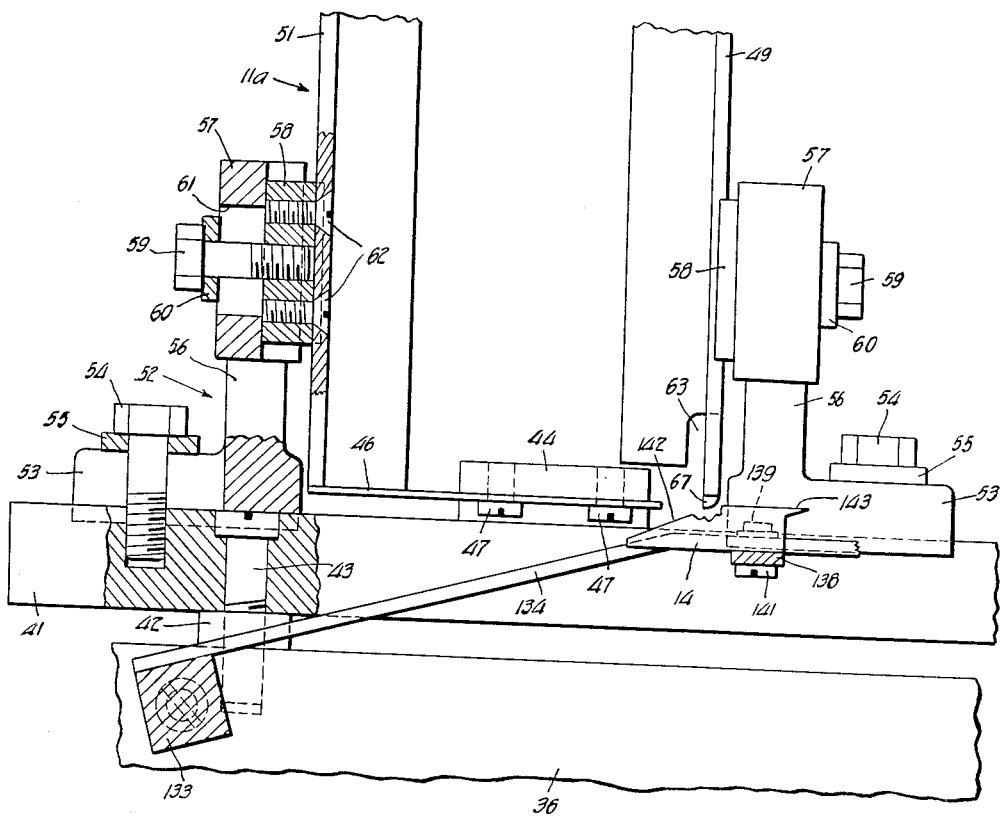
Figure 19:
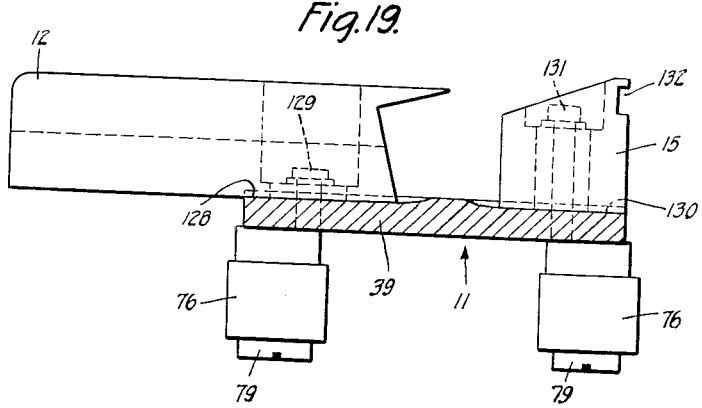
Figure 25:
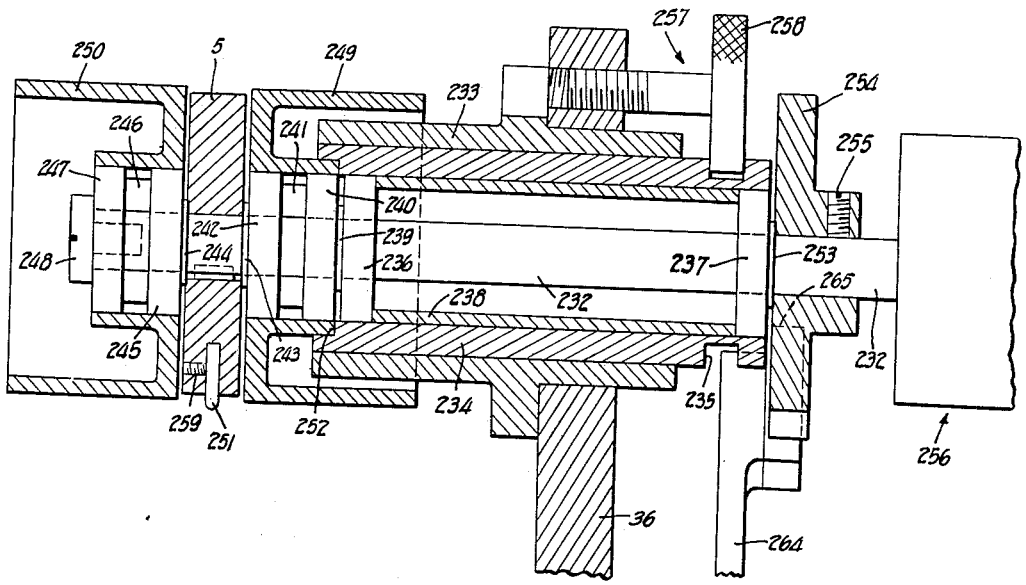
Figure 26:
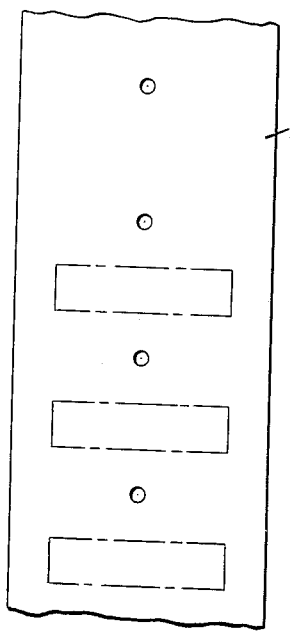
Figure 27:
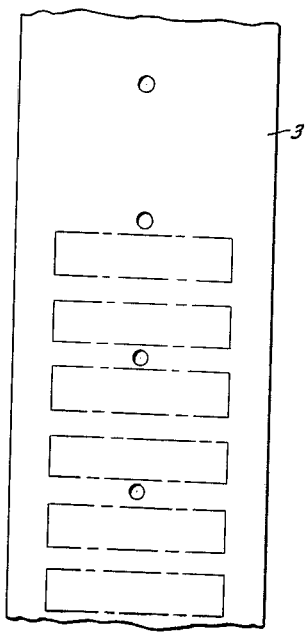
Figure 28:
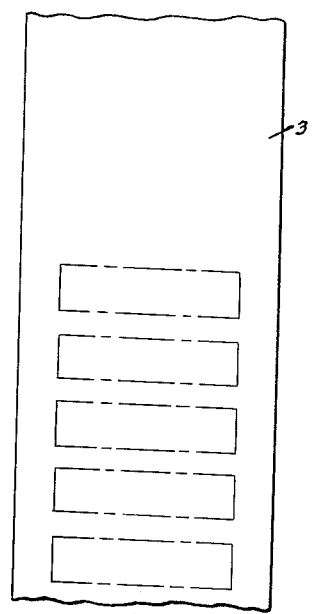
Figure 46:
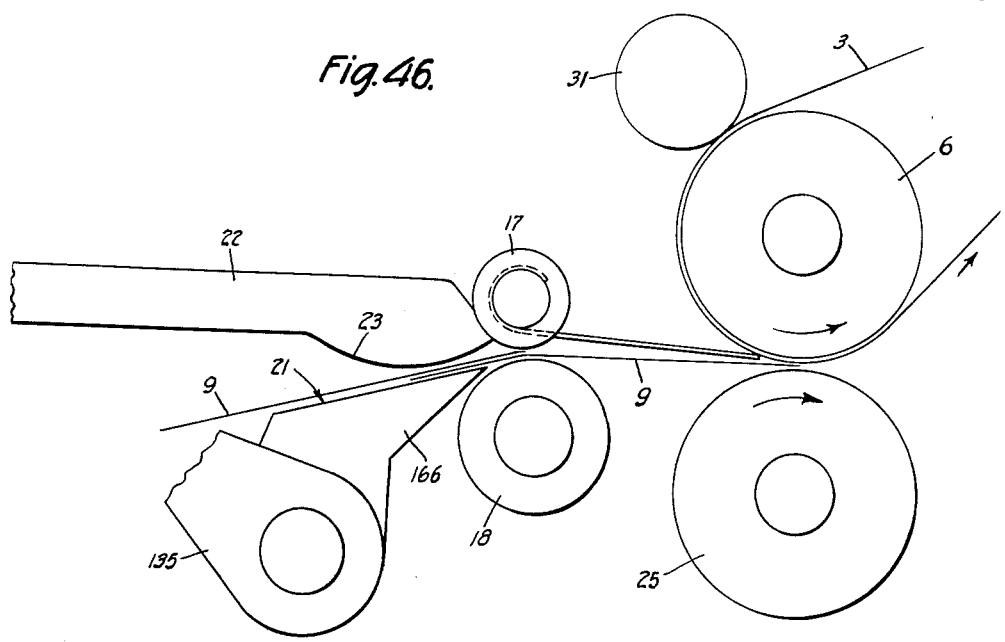
Figure 47:
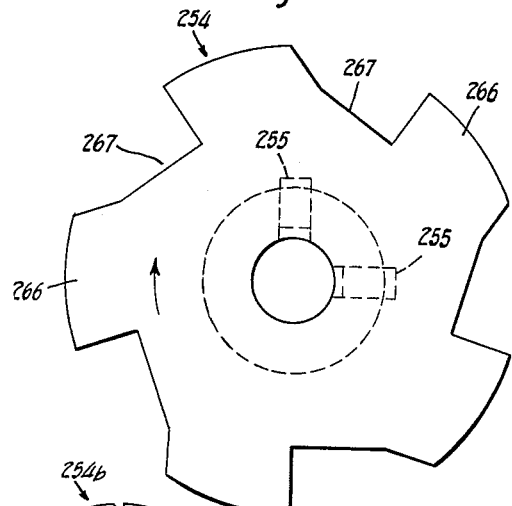
Figure 48:
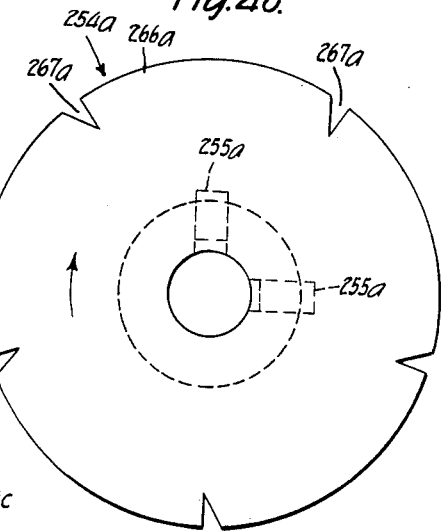
Figure 49:
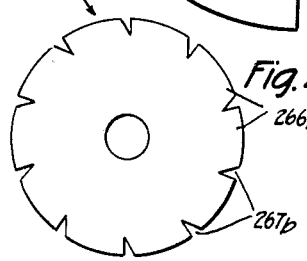
Figure 50:
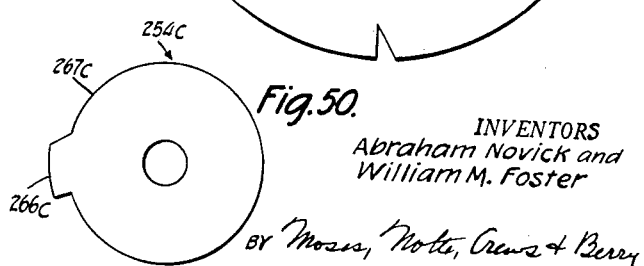

Figures 3, 4 and 5 jointly illustrate the same machine constituting, with some overlap, a showing similar to that of Figure 1, the composite view, however, showing many details not shown in Figure 1 and being upon a substantially larger scale than Figure 1;

Figure 6 is a transverse sectional view taken upon the line 6—6 of Figure 3, looking in the direction of the arrows;

Figure 7 is a fragmentary view in sectional elevation complementary to Figure 4 and showing a portion of the discharge conveyor upon which the used cards are accumulated;

Figure 8 is a fragmentary vertical sectional view taken upon the line 8—8 of Figure 1, looking in the direction of the arrows;

Figure 9 is a fragmentary vertical sectional view taken upon the line 9—9 of Figure 1, looking in the direction of the arrows;

Figure 10 is a fragmentary horizontal sectional view taken upon the line 10—10 of Figure 3, looking in the direction of the arrows;

Figure 11 is a fragmentary plan view showing the accumulating conveyor for used cards and a substantial part of the web printing and feeding mechanism;

Figure 12 is a fragmentary sectional view broken away intermediate its ends for compactness of illustration, the section being taken upon the line 12—12 of Figure 2, looking in the direction of the arrows, but showing the mechanism set up for comparatively slow web feed;

Figure 13 is a fragmentary sectional view showing details of certain gearing, shown in Figure 12, but set for faster web feed;

Figure 14 is a fragmentary sectional view taken upon the line 14—14 of Figure 5, looking in the direction of the arrows;

Figure 15 is a fragmentary sectional view taken upon the line 15—15 of Figure 5, looking in the direction of the arrows;

Figure 16 is a fragmentary plan view showing particularly the card magazine and the card feeding and guiding mechanism associated therewith;

Figure 17 is a fragmentary vertical sectional view taken upon the line 17—17 of Figure 16, looking in the direction of the arrows;

Figure 18 is a fragmentary longitudinal sectional view taken generally on the line 18—18 of Figure 10, showing the lower end of the card magazine and certain associated parts;

Figure 19 is a vertical longitudinal sectional view showing the card feeding carriage, the section being taken on the line 19—19 of Figure 16;

Figure 20 is a fragmentary vertical sectional view, showing particularly the liquid supply mechanism through which the ink on the cards is activated;

Figure 21 is a fragmentary detail view of a portion of the liquid supply mechanism;

Figure 22 is a fragmentary, detail sectional view of the mechanism illustrated in Figure 21, the section being taken upon the line 22—22 of Figure 23, looking in the direction of the arrows;

Figure 23 is a fragmentary plan view partly in section illustrating particularly the liquid supply mechanism, the section being taken on the line 23—23 of Figure 20;

Figure 24 is a fragmentary sectional view taken upon the line 24—24 of Figure 23, looking in the direction of the arrows;

Figure 25 is a detail sectional view taken upon the line 25—25 of Figure 4, looking in the direction of the arrows;

Figure 26 is a fragmentary view indicating diagrammatically how the addresses are spaced along a perforated web when the web is fed at the higher of two speeds made available in the machine;

Figure 27 is a view similar to Figure 26, showing how the addresses are spaced along the same web when the web is fed at the lower of the two available speeds;

Figure 28 is a view similar to Figures 26 and 27, but showing how the addresses are spaced along an unperforated web fed at the lower of the two available speeds;

Figure 29 is a diagrammatic view illustrating the complete web feed and the feeding of the cards from the point of printing onward for a setup in which the web is trained around the card feed controlling sprocket wheel;

Figure 30 is a view similar to Figure 29, but showing another setup in which the web bypasses the sprocket wheel and is fed at low speed;

Figure 31 is a sectional view taken through a counter housing which is carried on the sprocket wheel shaft, the section being taken upon the line 31—31 of Figure 32, looking in the direction of the arrows;

Figure 32 is a fragmentary sectional view taken upon the line 32—32 of Figure 31, looking in the direction of the arrows;

Figure 33 is a sectional view taken upon the line 33—33 of Figure 32, looking in the direction of the arrows;

Figure 34 is a horizontal sectional view taken upon the line 34—34 of Figure 31, looking in the direction of the arrows;

Figure 35 is a fragmentary horizontal sectional view taken upon the line 35—35 of Figure 4, looking in the direction of the arrows;

Figure 36 is a fragmentary vertical sectional view showing details of certain mechanism illustrated in Figure 4 in released position;

Figure 37 is a plan view of one of the cards showing fragments of the wedges inserted in the fold and ready to push the card forward away from the magazine;

Figure 38 is a fragmentary bottom view of the card illustrated in Figure 37;

Figure 39 is a longitudinal sectional view of the card illustrated in Figures 37 and 38;

Figures 40 and 45 are successive fragmentary operating views;

Figure 40 shows the lower fold of a card held down by the sucker before the carriage advances to carry the wedges toward engagement with the upper face of such fold;

Figure 41 shows the wedges advanced to the fold line and the forward edge of the card pulled down clear of the feed obstructing guides and ready to be fed forward away from the stack;

Figure 42 shows the card being fed forward by the carriage away from the stack, the lower fold having been just pulled free of the effective portion of the sucker;

Figure 43 shows the carriage advanced to its forward limit of movement and the card deposited in a position of rest which it will occupy during retraction of the carriage;

Figure 44 shows the carriage retracted and about to engage the trailing edge of the card for advancing it another step while detaching a succeeding card from the stack;

Figure 45 shows the carriage again advanced to its forward limit with a second card and feeding the previously advanced card into the bight of a feed roller couple;

Figure 46 is a fragmentary view showing how the cards are transferred by the feed roller couple to the printing rollers;

Figure 47 shows a control cam which may be employed upon the sprocket wheel shaft when perforated web is fed at either slow or fast speed;

Figure 48 shows another cam which may be employed when the perforated web is fed at relatively fast speed;

Figure 49 shows another cam adapted to be used with perforated web when the feed is at either slow or fast speed; and Figure 50 shows still another cam adapted to be used with perforated web when the feed is at either slow or fast speed.

As an aid in understanding the detailed description of the illustrative machine, the machine will first be described in a comparatively brief and general way without attention to detail.

A web supply reel 1 is mounted upon a shaft 2 (Figs. 1, 2 and 29). The web 3 is drawn from the reel successively around a guide roller 4, a sprocket wheel 5 and an impression cylinder 6. The web is rewound upon a reel 7 which is carried upon a shaft 8.

Address card 9 (Fig. 3) are supplied from a stack 10 which is held in a supporting magazine 11a, the cards being separated one by one from the bottom of the stack and advanced in timed relation with the feeding of the web. A reciprocating carriage 11 is provided for engaging the cards one by one and advancing each engaged card to a position of rest in which it is clear of the stack. For this purpose the carriage 11 is made to carry blocks 12 having wedges 13 formed at their forward ends. The wedges engage in folded corners of each card to pull the corners down clear of the magazine and to advance the card through the first feeding step. The advancement of the card through the first step carries the trailing edge of the card beyond a stationary stop 14, which stop prevents retrograde movement of the card with the carriage as the carriage is retracted to its starting position.

A sucker 14a presses the lower card fold upward against the stack as the carriage is retracted and pulls it down near the end of the retracting movement.

The carriage also includes pusher blocks 15 which are moved to the rear of the advanced and arrested card by the retraction of the carriage and which on the next forward movement of the carriage positively push the card forward to a constantly running feed roller couple 16 which comprises an upper roller 17 and a lower roller 18.

As the cards approach the feed roller couple 16 they are rearranged into overlapping relation. This is brought about by reason of the fact that the rollers 17 and 18 travel too slowly to carry a delivered card clear of the feed roller bight before a following card has been advanced into the feed roller bight. In order to assure the orderly arrangement of the cards in overlapped relation the line of centers of the rollers 17 and 18 is not disposed in a plane 19 (Fig. 45) at right angles to the path of the carriage 11, but is tilted to lie in a plane 20 so that the cards will be given an upward tilt by the feed rollers. A shelf 21 at the introductory side of the feed rollers is inclined to extend tangent to the rollers. A guide bar 22 disposed above the card path is formed with a cam 23 which extends down across the card path and depresses the leading edge of each card onto the upper face of the card which precedes it. When the trailing edge of the card is left unsupported by the retraction of the carriage the cam 23 assures the depression of the card body below the feed plane of the card next to be delivered.

As the cards emerge from between the rollers 17 and 18 they are fed at an upward inclination against a downwardly sloping guide 24 which directs them between the bed cylinder 6 and an opposed cylinder 25. As the cards pass between the cylinders 6 and 25, each card has the address which it bears fed in contact with the web 3 so that the address is printed on the web. From the cylinders 6 and 25 the cards pass onto a conveyor (Figs. 1 and 4) which accumulates them for removal from the machine. The conveyor 26 carries the cards along a table and toward an upwardly inclined obstructing plate 27. The cards pile up against the plate 27 in a somewhat loose stack formation.

The web 3 has been described as trained around a sprocket or pin wheel 5, this being the arrangement illustrated in Figures 1, 4 and 29. The sprocket 5 is not, however, a feeder for the web 3 but is instead positively driven by the web to control mechanism to be described, through which the timing of the card feeding carriage relative to the web feeding is adjusted from time to time. The sprocket wheel 5 is utilized with perforated tape whenever it is essential that a prescribed length of web be allotted to each address. When this is not important, an unperforated web is employed and the web is led directly from the roller 4 around a roller 28, as in Figure 30, and onto the bed cylinder 6 without engaging the sprocket 5.

Provision is made of a barometric feed 29 comprising an inverted bottle 30 (Fig. 4) through which an activating liquid is supplied to a web moistening roller 31. The roller 31 bears against the cylinder 6 through the web 3 and serves to moisten the web so that the web will take the impression from each card as it travels in contact with the hectographed address appearing on the card. The address appearing on each card is a mirror image of the rectified address which is caused to appear on the web.

The machine is supported upon a table 32 comprising legs or posts 33 and an open top 34. The machine comprises side plates 35 and 36 which are connected to one another through tie bars 37 and 38.

The carriage 11 comprises a plate 39 which rides upon the upper faces of the plates 35 and 36 (Figs. 3 and 6) being adapted to travel in guideways formed between the plates 35 and 36 and guide bars 40 and 41 respectively. The guide bar 40 is spaced from the plate 35 by washers or rings 42 and is secured to the plate by screws 43, the washers and screws being disposed beyond the ends of the range of movement of the carriage plate 39. The guide bar 41 is similarly spaced from and attached to the plate 36.

The magazine parts are supported from the bars 40 and 41. On each of these bars there is mounted an arm 44 by means of screws 45 (Figs. 16 and 17). Each arm 44 has a plate 46, see Figure 16 also, secured against its lower face by screws 47. The plates 46 protrude inward beyond the inner ends of the arms 44 and constitute supporting ledges upon which the bottommost card of the stack rests. The supporting ledges formed by the plates 46 do not extend as far forward as the forward boundaries of the stack magazine but terminate well back from such boundaries so as not to interfere with the dropping down of the lower fold of the bottommost card.

The magazine comprises two forward angle bars 48 and 49 and two rear angle bars 50 and 51 (Figs. 3, 6 16, 17 and 18). The angle bars extend vertically and constitute card guiding corner posts of the magazine. The angle bars 48 and 50 are supported from the bar 40 while the angle bars 49 and 51 are similarly supported from the bar 41. The angle bars are all similarly mounted and therefore a description of the mounting of the angle bar 51 upon bar 41 will suffice for all. Bracket 52 is provided with a slotted horizontal portion 53, see particularly Figure 18, which rests upon the bar 41. The lower face of the bracket 52 is channeled to fit around opposite sides of the bar 41, and the bracket is secured to the bar by means of a screw 54 and a washer 55, the screw being passed through the slot of the bracket and threaded into the bar 41. The bracket 52 further includes an inwardly reaching portion 56 and a channeled vertically extending portion 57. The channeled portion 57 embraces a mounting block 58 of the angle bar 51 and is secured to the block by means of a screw 59 and a washer 60, the screw being passed through a vertical slot 61 formed in the bracket. The block 58 is attached to the angle bar 51 by means of screws 62. The heads of the screws stand flush with an inner wall of the angle bar 51 and the screws are threaded outward into the block 58. The block 58 is itself channeled (Fig. 10) to embrace and fit the rear wall of the angle bar 51. The forward angle bars 18 and 49 are alike and are formed with notches 63 to accommodate the rear ends of side guides 64 which are carried by arms 65 (Figs. 3 and 10). The respective arms 65 are secured upon the bars 40 and 41 by screws 66. The forward faces of the angle bars 48 and 49 have tongues 67 (Figs. 17, 18 and 40) provided at their lower ends. The tongues extend down beyond the upper faces of the ledge plates 46 and hence stand in position to obstruct the advancement of the bottommost card away from the stack. In order for the bottommost card to be separated from the stack and advanced it is necessary for its leading edge to be depressed below the level of the tongues 67 and substantially below the level of the supporting surfaces of the ledge plates 46 as in Figure 41.

In order that the mechanism may be understood it is important that the card construction be clearly understood. Each card 9 (see Figs. 37 to 39) comprises an upper fold 70 and a lower fold 71 which are divided by a fold line 72 at the forward edge of the card. The lower fold 71 does not extend as far back as the upper fold 70. In order that the cards may be of substantially uniform thickness throughout, therefore, the upper fold is extended and a portion 73 of it is turned under and pasted to provide a double thickness portion of the upper fold to the rear of the lower fold 71. The upper fold is provided with a cutout 74 through which an address, mirror printed with hectograph ink, is exposed (Fig. 37). The lower fold is narrower than the upper fold, being formed with notches 75 so that the stack may be supported from the ledges 46 (see Fig. 16 also) through marginal portions of the upper fold and with the lower fold free to drop down between the ledges and out of engagement with it. At its forward margin, however, beyond the forward edges of the ledges, the lower fold is of substantially full width so that the card feeding wedges 13 may advance into the angles formed between the upper fold and the narrow end portions of the lower fold (Figs. 37 and 41) to perform their camming and feeding functions.

The carriage plate 39 is guided by four rollers 76 (Figs. 3, 16 and 17) which bear in opposed pairs against the side plate 36. Each roller 76 is mounted upon a headed pivot screw 77. Each screw has a bearing portion 78 of comparatively large diameter and a reduced threaded end portion 79, there being a shoulder where the portions 78 and 79 join and bear against the lower face of the plate 39. Each screw has its body passed successively through the associated roller 76, a spacing collar 80 and the plate 39 and is clamped against the plate by a nut 81.

The carriage 11 is driven from a motor (not shown) through a belt 82 (Figs. 1, 2, 4, 9 and 12) and a pulley 83, the pulley being keyed on a sleeve portion 84 of a pinion 85. The pinion 85 is revolubly mounted upon a stationary shaft 86. The shaft 86 has a shoulder portion which bears against the plate 35 and a reduced threaded end portion 87 upon which a clamping nut 88 is threaded. A collar 89 secured to the shaft 86 prevents play of the pulley 83 and the pinion 85 relative to the side plate 35.

When the motor is idle, the pulley 83 may be manually advanced as desired. For this purpose, a crank 90 having a recessed hub 91 is rotatably and slidably mounted upon the shaft 86, being urged away from the collar 89 by a coil spring 92. A collar 93 secured to the shaft 86 by a set screw 94 limits movement of the crank away from the collar 89, to retain the crank in a normal inoperative position. The crank hub 91 is formed at one side with a slot 95 which is adapted to receive a pin 96 that projects from the hub of the pulley 83. When it is desired to turn the pulley 83 manually the crank handle 97 is seized and thrust inward while being turned to align the notch 95 with the pin 96. When such alignment is effected the crank moves inward to effect a driving connection from the crank 90 to the pulley through the pin 96. When the desired operation has been effected, the crank handle 97 is released and the crank 90 is then restored to its normal position by the spring 92.

The pinion 85 drives a gear 98 which is fast upon a shaft 99. Shaft 99 extends across the machine, being rotatably supported in the side plates 35 and 36 and in a bearing bracket 100 which is secured to the side plate 36. The hub portion of the gear 98 is made fast upon the shaft 99 by means of a pin 101. The shaft has pinned to it a pinion 102 for driving a train of gearing which will be described at a subsequent point.

The shaft also has pinned to it a disc 103 which forms the driving member of a friction clutch 104. The clutch 104 also comprises a driven member 105 formed with recesses 106 in each of which a disc 107 of friction material is set, all of the discs engaging the driving member 103. The driven member 105 is formed with a central recess 108 in which a saucer-like spring disc 109 is received. The disc 109 urges the driven clutch member 105 toward the driving clutch member 103. A screw 110 is passed centrally through the disc and is threaded axially into the shaft 99. A nut 111 is threaded on the screw between the shaft and the disc. At the opposite side of the disc a clamping nut 112 and a lock nut 113 are threaded onto the screw. The friction clutch members are constantly in driving engagement with one another but provision is made for obstructing the driven member 105 at times. The details of that feature will, however, be described at a subsequent point.

The clutch member 105 carries a crank pin 114 (Figs. 3, 8 and 10) upon which one end of a connecting rod 115 is pivotally mounted. The opposite end of the connecting rod 115 is pivotally mounted upon a pin 116 which is carried by a rocker arm 117 intermediate the ends thereof. The pin 116 has a collar 118 pinned to its outer end, and includes a knob portion 119. The pin 116 is passed at one end through the connecting rod and at its opposite end through the rocker arm 117. The pin is held in place by a nut 120 and a washer 121. The connecting rod 115 serves to convert rotation of the clutch member 105 into reciprocatory movement of the rocker arm 117, the arm 117 being mounted on a stud 117a secured to the side plate 36. The rocker arm 117 is connected at its free end through a pin 122 to a carriage driving arm 123. The pin 122 has an enlarged portion 124, a part of which is made non-circular or flat to fit into a slot 125 of the arm 123. The pin portion to the left of the portion 124 is threaded and has thereon a washer 125a and a nut 125b to secure the pin 122 to the arm 123. The arm 123 is pivotally connected to a pin 126 which is carried by a plate 127. The plate 127 is secured upon the carriage plate 39 and extends downward from the latter. The carriage is shown in Figures 3 and 10 in its most retracted position. In the ensuing revolution of the clutch member 105, the carriage is pulled forward by the arm 123 to its forward limit of movement and is then returned to the starting point. So long as rotation of the clutch member 105 is not interrupted the carriage will be uninterruptedly reciprocated through the range of movement referred to.

The carriage includes two of the wedge blocks 12 (Figs. 16 and 17), each fitted into a depression 128 (see Fig. 19 also) of the plate 39. The blocks 12 are adjustable lengthwise of the depressions and each block is held in place by a screw 129. The wedge blocks are disposed to travel just within the lateral boundaries defined by the side guide bars 64. The carriage also has secured upon it two of the pusher blocks 15 (Figs. 3, 10 and 16), the pusher blocks being located inward from the wedge blocks 12 but disposed to travel at opposite sides of certain card guiding mechanism which will be described presently. Each pusher block 15 is fitted into a recess 130 (see Fig. 19 also) of the carriage plate 39 and is secured in place by a screw 131. Each pusher block has a notch 132 in its forward face in which the trailing edge of a card becomes lodged as the card is being thrust forward by the pusher blocks.

A tie bar 133 (Figs. 3, 10 and 18) extends between the side frame plates 35 and 36, and has the rear ends of guide strips 134 secured to it by screws 135. The strips 134 slope upward and forward towards the card path to a point just a little behind the forward extremity of the magazine 11a, and thence extend horizontally forward. The forward ends of the guide strips 134 rest upon supporting arms 135 to which they are attached by screws 136. The arms 135 are made fast upon a stationary shaft 137 which is fixed in the side plates 35 and 36. The inclined portions of the strips 4 lie beneath the stack 10 in position to limit downward swinging of the lower fold 71 of the bottommost card 9 away from the stack. The horizontal portions constitute limiting lower guides along the card path.

The strips 134 at a short distance in front of the forward edge of the magazine 11a support a stationary cross strip 138 (Figs. 3, 16, 17 and 18). The cross strip 138 is secured in place by screws 139 which are passed downward through slots 140 of the strips 134 and threaded into the cross strip 138. The anti-backfeed stop 14 is secured upon the cross strip 138 by screws 141. The stop 14 has an upwardly sloping rear face 142 which is adapted to cam the longitudinal central zone of the card upward as it is advanced by the carriage. The stop 14 includes at its forward end an overhanging nose 143 beyond which the trailing edge of a card is carried by the forward stroke of the carriage, as in Figure 43. Because the wedges operate at a lower level than the upper surface of the stop 14 the central portion of the card snaps down past the nose 143 as soon as it moves forward far enough to clear the nose. As the carriage returns, the trailing edge of the card may be carried backward until it engages the forward face of the stop 14, as in Figure 44, but since it will then be lodged beneath the nose 143 there is no possibility of its being carried backward any farther.

The sucker 14a (Figs. 3, 6, 10 and 40) which cooperates with the wedge blocks 12 in separating the cards from the stack is operated from an off-set 144 of the rocker arm 117. A connecting rod 145 is pivotally connected to the arm 144 through a pin 146. The rod 145 has an offset slotted rear end portion 147. Stop screws 148a fast on the frame plate 35 (Figs. 3 and 10) cooperate with the arm 148 to limit the movement of the sucker 14a in both directions. A crank arm 148 fast upon a rock shaft 149 carries a pin 150 which plays in the slot 151 of the connecting rod 145. Screws 152 and 153 are threaded through the offset portion 147 of the rod 145 in alignment with the slot 151 and may be adjusted to determine the extent to which the pin 150 can move along the slot. Lock nuts 154 are provided for fixing the screws 152 and 153 in adjusted positions.

The shaft 149 has an arm 155 clamped upon it. A tube 156 is secured in the arm 155 and extends through the arm with a projecting end fitted into a flexible hose 157. The hose 157 is connected to a suitable continuous source of suction (not shown). The tube 156 supports at its forward end, and communicates with, a suction cup 158, the cup 158 and the tube 156 constituting the sucker 14a.

As the rod 145 moves forward, the screw 152 is carried into engagement with the pin 150 to rock the arm 148 and the sucker in a counter-clockwise direction for causing the sucker 14a to press against the lower face of the stack 10 through the lower fold 71 of the bottommost card 9, as in Figure 43. This occurs at the end of the forward stroke of the carriage. The sucker maintains this upper position as the carriage returns rearward but at the end of the rearward stroke the screw 153 engages the pin 150 to rock the arm 148 and the sucker in a clockwise direction to the position illustrated in Figures 40 and 43. This causes the sucker to pull the lower fold of the bottommost card away from the stack. The sucker then remains in this lowered position until the carriage has again substantially completed its forward movement.

In order to cause the sucker to hold its upper and lower positions until positively actuated by the rod 145, the shaft 149 is provided with friction mechanism 159 (Fig. 10). A collar 160 is secured to the shaft 149 by a set screw 161. A coil spring 162 bears frictionally at its opposite ends against the collar 160 and against a disc 163. A friction disc 164 is interposed between the disc 163 and the plate 35. The structure described serves frictionally through the discs to oppose turning of the shaft 149 in either direction.

The way in which the parts coact for effecting the orderly separation of the cards from the stack is illustrated in Figures 40 to 45, inclusive. In Figure 40, the carriage 11 is in its most retracted position with the wedges 13 standing clear of the lower fold of the bottommost card. The sucker has just been moved downward to carry the lower fold 71 away from the stack so that its corners will be caught beneath the wedges as the wedges move forward. In Figure 40 the fact is clearly brought out that the tongues 67 extend below the ledge plates 46 and hence in a position to obstruct the feeding of the bottommost card away from the stack. As the wedges move forward beneath the tongues 67 they come into engagement with the forward corners of the lower fold and press these corners downward, pulling the forward folded edge of the bottommost card down below the lower extremities of the tongues 67, as seen in Figure 41. The bending downward of the upper fold as illustrated in Figure 41 is assisted by the fact that the sucker holds the lower fold taut during this action.

When the wedges have been moved fully into the angle between the upper and lower folds, as shown in Figure 41, the ends of the folded edge of the bottom card are clear of the tongues and free to be moved forward. An intermediate stage in this forward travel is illustrated in Figure 42 at a point where the lower fold has just been pulled free of the suction exerted by the sucker.

As the card is carried forward by the wedges 13, the longitudinal central zone of the card is caused to ride up the rear face 142 of the stop 14 and across the top face of the stop. The forward limit of carriage movement is illustrated in Figure 43. At that point the card has just been carried clear of the stop 14 so that its central zone has sprung down in front of the stop 14 and below the level of the nose 143.

The carriage now returns, carrying the card with it for a short distance until the card is arrested by the stop 14 as shown in Figure 44. Throughout almost the entire retractive movement of the carriage, the sucker 14a remains in its elevated position as illustrated in Figure 43. Toward the conclusion of the retractive movement the sucker is moved down to the position of Figure 44, the condition being the same as that shown in Figure 40. The retracting movement of the carriage to the position of Figure 44 locates the pusher blocks 15 behind the trailing edge of the card which has been thus far discussed so that at the next forward movement of the carriage that card will be thrust forward by the pusher blocks 15 and the following card will be advanced by the wedges to take its place.

As the card is thrust forward by the pusher blocks, its margins ride up on cam blocks 165 which are located beneath the bar 22 (Figs. 3, 10, 43 and 45) and mounted upon the side guide bars 64. The card margins are then advanced beneath the cam portions 23 of the bars 22, the cams serving to depress the margins of the card toward the shelf 21. The shelf 21 is composed of arms 166 which are desirably made integral with the hub portions of arms 135. Fingers 166a cooperate with the arms 166 to guide the card into the bight of the rollers 6 and 25.

The pusher blocks 15, it will be remembered, thrust the leading end of the card into the bight formed by the rollers 17 and 18. Although the average speed of the carriage is considerably greater than the feed rate of the rollers 17 and 18, the speed of the carriage varies and may be less than the constant feed rate of the rollers 17 and 18 as the card is delivered to said rollers. The upper roller 17 consists of two narrow discs and is an idler roller. The lower roller 18, however, is made up of two halves 167 which are mounted in end-to-end relation upon a driven shaft 168 (Figs. 3, 4, 8, 9 and 11).

The shaft 168 is driven in common with the web feeding mechanism and the conveyor 26 from pinion 102. The pinion 102 drives a gear 169 which is mounted upon a stud 170. The gear 169, in turn, drives a gear 171 which is fast upon a shaft 172, the shaft 172 being the drive shaft of the discharge conveyor 26. The gear 171 drives a gear 173 which is fast upon shaft 174, the shaft 174 also having fast upon it the impression cylinder 6 by which the web and the cards are fed during the printing operation. The gear 173 drives a gear 175 which is fast upon the shaft 168. The train of operating connections described coincides with the arrangement illustrated in Figures 4 and 29. In the illustrative machine this causes the cylinders 6 and 25 to feed the web a little less than two inches for each revolution of the shaft 99.

In some cases it is desirable to cause the web to travel at just half the speed referred to so that the web will be advanced just one inch for each printing card delivered from the stack. For this purpose, the stud or pivot screw 170 may be transferred from a threaded bore 176 of the plate 36 to a threaded bore 177 of the plate. The gear 169 has fast with it a smaller gear 178. When the parts are secured as illustrated in Figures 4 and 12 the gear 169 meshes directly with the pinion 102 and with the gear 171. When the threaded bore 177 is used as shown in Figure 12, however, the gear combination 169—178 is turned over so as to locate the gear 169 out of the plane of the gear 171, as in Figure 13, and to locate the gear 178 in the plane of the gear 171 and in mesh with the latter gear. The gear 169 in either case stands in mesh with the broad pinion 102 and is driven by the pinion, but when the threaded bore 177 is utilized the drive received by the gear 169 from the pinion 102 is transmitted by the gear 178 to the gear 171.

Regardless of whether the threaded bore 176 or the threaded bore 177 is utilized, the bed cylinder 6 and the card feeding roller 18 always travel at equal peripheral speeds, the roller 18 bearing the same ratio to the pitch diameter of its driving gear 175 that the cylinder 6 bears to the pitch diameter of its driving gear 173.

As the cards emerge from between the printing and impression cylinders 25 and 6, they are deposited in overlapped relation into belts 181 of the conveyer 26 (Figs. 4, 7, 9 and 11). The belts 181 run upon driving pulleys 182, which are fast upon the drive shaft 172 and upon idler pulleys 183. The belts 181 are supported upon a broad plate 184, one end of which is upturned to constitute the card arresting plate 27.

The plate 184 is supported from a vertically disposed longitudinally extending beam 185. One end of the beam is supported from a stationary shaft 186. The shaft 186 is mounted in frame side plate 36, being secured thereto by a pin 187. The shaft 186 extends through a sleeve portion 188 of a bell crank 260 which will be described in detail at a subsequent point. The sleeve portion 182 is confined between frame plate 36 and a collar 189, the collar 189 being secured to the shaft 186 by set screw 191. The shaft 186 at its free inner end carries a collar 193 which is secured to the shaft by set screw 194. The shaft end is passed through the beam 185, and headed screws 195 are passed through the beam and threaded into the collar to clamp the beam firmly against the collar. The opposite end of the beam 185 is supported upon a leg 196 having a threaded stem 197. The threaded stem 197 is passed downward through the table top 34 and is clamped to the table top by a nut 198.

Flat faced arms 199 are secured to and extend in opposite directions from the beam 195 with their upper faces in a common plane, by means of headed screws 200. The plate 184 is secured to each of the arms by a screw 201 whose head is countersunk.

Near the delivery end of the conveyor 26 slotted brackets 202 are adjustably secured upon opposite sides of the beam 185 by headed screws 203. Each screw is passed through the slot of its associated bracket and threaded into the plate 185. Each bracket 202 has an upturned end portion formed to provide a bearing sleeve 204. These bearing sleeves carry shaft 205 upon which the idler pulleys 183 rotate.

As the cards accumulate against the arresting plate 27, they are removed manually from time to time and replaced in a filing drawer in the same order in which they were originally filed, so that without more ado they can, when wanted, be again supplied to the magazine 11a in the same sequence as before.

The web supply reel 1 is supported upon an arm 206 (Figs. 1, 2, 5 and 8) which is made fast upon the side plate 36 by a pair of screws 207. The arm 206 supports a reel shaft the shaft being secured to the arm by a pin 209. The shaft 208 has a collar 210 secured to it by pin 211 for arresting the central bearing or hub 212 of the supply reel 1. The hub 212 forms a part of a cylindrical reel core 213. Side plates 214 and 215 are secured to the core by screws 216. The plate 214 is formed with a central opening 217 which is large enough to pass freely over the collar 210. When the reel has been placed upon the shaft a retaining collar 218 is applied to the shaft and pressed lightly against the hub 212 of the reel core, being then made fast upon the shaft by the tightening of a thumb screw 219 which is threaded through the collar.

An arm 220 is secured upon the shaft 2 by means of a set screw 221 and extends upward from the shaft. A stub shaft 222 is secured in the arm 220 by means of a set screw 223 and rockably supports a brake arm 224 which is confined upon the stub shaft between collars 225. The brake arm is provided with a facing 226 of friction material such as leather which bears by gravity against the periphery of the reeled web to keep the web taut whenever it is being pulled off the reel.

It will be remembered that when passing from the reel the web 3 travels first around a guide roller 4. The roller 4 is revolubly supported upon a shaft 227 (Figs. 4 and 8) which is fixedly mounted in the arm 206. The roller 4 is retained against axial movement between the arm 206 and a collar 228, the collar being affixed to the shaft by a pin 229. Collars 230 are secured upon the roller 4 by set screws 231 to form adjustable side guides for the web 3.

From the roller 4 the web passes around the pin wheel or sprockets 5 (Figs. 4 and 7). The pin wheel 5 is keyed upon a shaft 232 which shaft is mounted for rotation and for axial adjustment in the frame side plate 36. A long sleeve bearing 233 is provided with a flange 234 through which it is affixed to the side plate 36. A sleeve 234 having a circumferential groove 235 formed in it is slidingly mounted in the sleeve bearing 233. The sleeve 234 supports ball bearings 236 and 237 which are disposed at opposite ends of a spacer sleeve 238 and which rotatively support the shaft 232. To the left of the bearing 236 as the parts are seen in Figure 25, the shaft 232 has successively upon it a spacing washer 239, a ball bearing 240, a spacer 241, a ball bearing 242, a spacing washer 243, the pin wheel 5, a spacing washer 244, a ball bearing 245, a spacer 246, a ball bearing 247, and a headed screw 248. The screw 248 is threaded into the shaft with its large head overlying the ball bearing 247.

The ball bearings 240 and 242 rotatively support a roller section 249 while the ball bearings 245 and 247 rotatively support a roller section 250. When the feeding of the web is commenced the perforations of the web, interlocking as they do with pins 251 of the pin wheel 5, necessarily drive the pin wheel 5 and the shaft 232. The roller or pulley sections 249 and 250 are, however, free to slip relative to the web, this being particularly desirable at the starting and stopping of the machine because it avoids the application of a belt effect by the web to the pin wheel.

It is the circumference of the pulley sections, however, which determines the exact length of web feeding required to produce one revolution of the pin wheel. The pulleys, in other words, determine the effective radius through which the web acts upon the pin wheel shaft. The pin wheel body is of slightly less diameter than the pulley diameter.

The hub portion of the roller section 249 bears at one end against a shoulder 252 formed in the sleeve 234. To the right of the ball bearing 237 as the parts are seen in Figure 25, the shaft 232 carries successively a spacing washer 253, a cam 254 which is secured to the shaft by a set screw 255, and a counter housing 256.

It is important that the pins 251 of the pin wheel 5 be located in exact alignment with the perforations of the web. In order that webs of different width may be utilized it is important that the pin wheel be shiftable in the direction of the length of the shaft 232. For this purpose, the entire assembly carried in the sleeve bearing 234 is made axially adjustable as a unit. A screw 257 having a knurled head 258 is threaded into the side frame plate 36 and has the margin of its head 258 disposed in the circumferential groove 235 of the sleeve 234. Rotation of the screw adjusts the sleeve 234 axially, and the sleeve 234 carries with it all of the parts supported by it including the shaft 232, the roller sections 249 and 250, the pin wheel 5, the cam 254, and the counter housing 256.

The pins 251 of the wheel 5 are set into radial bores of the wheel and are fixed in place by set screws 259.

The pins can be adjusted to protrude just the desired amount beyond the circumferential surfaces of the pulley sections 249 and 250.

The purpose in driving the wheel 5 by the web is (1) to enable the count exhibited by the counter to constitute an exact measure of the length of web fed, and (2) to correct the timing of the card feeding carriage 11 from time to time relative to the feeding of the web 5. The second of these objects is of particular importance because the web when printed must carry one complete address for each prescribed unit of length without any accidental or cumulative error occurring which would be apt to cause the addresses to be cut in two when the web is later fed through an automatic cutting and patch applying mechanism. The coordination of card and web feed could have been secured by positively driving the web through a pin wheel whose travel relative to the card feeding mechanism is positively controlled. This, however, would impose upon the web perforations the strain of suddenly starting into motion the entire web supply reel at the beginning of an operation. By causing the web to be frictionally fed, the web may be permitted to slip at the outset without any harm resulting. This is true because the pin wheel and the mechanism operated by it will correct the out-of-phase condition which the preliminary slipping produces. The frictional feeding is not likely to tear the web.

It will be remembered that the carriage 11 is driven through a friction clutch 104 so that the carriage can be held stationary without interrupting the feeding of the web. As the parts are illustrated in Figures 2, 4 and 12, the driven member 105 is held stationary with the carriage 11 in its extreme retracted position. The bell crank 260, rockably mounted upon the shaft 186, carries at the outer end of its lower arm 261 a stop finger 262 which is adapted to cooperate with a projecting stop 263 carried by the driven clutch member 105. There is only one stop 263 provided on the clutch member 105, and hence the carriage is only adapted to be arrested by the finger 262 in its extreme retracted position at the conclusion of an operating cycle. An operating cycle of the carriage corresponds obviously to one complete rotation of the clutch member 105.

The upper arm 264 of the bell crank 260 is formed with a pointed nose 265 which rides against the periphery of the cam 254. As shown in Fig. 2, a high part 266 of the cam 254 is in engagement with the nose 265, and this causes the finger 262 to be held in the path of the projecting stop 263 to obstruct rotation of the clutch member 105. As soon as the nose 265 rides off the high part 266 of the cam 254 it will be swung into a notch 267 of the cam by the action of a tension coil spring 268 which is connected at its opposite ends to pins 269 and 270, carried respectively by the arm 264 and the side frame member 36. As soon as the finger 262 clears the stop 263 the clutch member 105 will be set into motion and will be driven by the clutch member 103 until it is again arrested by the engagement of the finger 262 with the stop 263.

With the gear connections in effect which are illustrated in Figures 4 and 29, and assuming that no slipping of the web occurs, a complete rotation of the clutch member 105, and hence a complete cycle of the carriage 11, will be effected in a little less than one-fifth of a complete revolution of the cam 254. Substantially before the completion of the cycle another high part 266 of the cam 254 will have been brought beneath the nose 265, causing the finger 262 to be projected into the path of the stop 263. At the conclusion of the carriage cycle, therefore, the carriage will be arrested until the nose 265 rides off the currently effective high part 266 of the cam. The high parts of the cam terminate abruptly at equi-angular intervals, there being five identical operating divisions of the cam, each including a notch 267 and a high part 266.

When the gearing connections illustrated in Figure 4 are employed, the result produced is that shown in Figure 26, wherein one card is fed and one address is printed for each two inches of web feed. The illustrative pin wheel measures ten inches in circumference.

The cam 254 is not removable from the machine. Other cam forms may, however, be included by the manufacturer instead of the cam 254, the selected one being always a permanent part of the machine.

In Figure 48 a modified form of cam 254a is illustrated as used instead of the cam 254. The high parts 266a of the cam 254a are relatively long and the notches 267a are comparatively short. This cam is also adapted to adjust the timing after each carriage cycle, the difference being that the finger 262 is restored to stop arresting position as soon as it has been cleared by the stop 263. The cam 254a is adapted for use only when one address is printed on perforated tape for each two inches of web fed; i. e., when five addresses are printed for each revolution of the pin wheel. When this cam is employed the counter is geared to count five for each revolution of the pin wheel so that the number of addresses can be read directly on the counter. This cam and this counter gearing, would be provided only in a machine based on a price per address basis, and in which the addresses are to be printed at two inch intervals.

It is not essential that the timing of the carriage relative to the web be corrected at each card feeding operation, since there will be very little cumulative error if the clutch member 105 is permitted to operate uninterruptedly for several cycles. The cam 254 which has been described as used when the web is fed at relatively high speed may also be used when the web is fed at relatively low speed, but in that case correction will occur only after two successive card feeding cycles. When the web is fed at comparatively slow speed a card feeding cycle will be completed in a little less than one-tenth of a revolution of the pin wheel. When the first card feeding cycle is initiated by the dropping of the nose 265 off a high part 266 that cycle will be completed before the nose 265 has been lifted out of the following notch, because the notch extends through a little more than one-tenth of the circumference of the cam 254. A second cycle will therefore automatically follow. Shortly after the initiation of the second cycle, however, a high part 266 of the cam will come under the nose 265 and cause the finger 262 to be projected to obstructing position. At the conclusion of the second card feeding cycle, therefore, the carriage will be arrested until the feeding of two inches of web has been completed. With the web being fed at the slower of the two available speeds the arrangement of Figure 27, in which one card is fed and one address is printed for each inch of web feed, is produced. With the counter connected to count ten for each pin wheel revolution the machine can be leased on a footage basis or a price per address basis since the user could be depended upon not to run the web at high speed and thereby indicate an erroneously high number of addresses printed.

An alternative cam 254b is illustrated in Figure 49. This cam is like the cam 254a except that there are ten of the notches 267b and ten of the high parts 266b. This cam may be used in conjunction with either high or low speed web feeding. When the web is fed at high speed a carriage cycle is initiated by the dropping of the nose 265 into one of the notches 267b. At the end of one-tenth of a revolution of the cam 254b the nose again drops off of a high part of the cam, but since the carriage cycle is only a little more than one-half completed at this time, the intermediate movement of the finger 262 into and out of obstructing position, which is caused to occur, is without effect. During the latter part of the cycle the nose 265 rides onto a second high part 266b so that the finger 262 is projected into position to arrest the clutch member 205 at the conclusion of the card feeding cycle.

When the cam 254b is employed in connection with the slow speed web feed, each carriage cycle initiated by the cam is completed in a little less than one-tenth of a revolution of the cam, so that a fresh cycle is initiated at every tenth of a revolution of the cam.

The cam 254b would always be provided with the counter geared to count ten for each revolution of the pin wheel. Thus the number of addresses may be indicated for slow web feed or the inches of web fed may be indicated for either high or slow speed web feed.

The cam 254c illustrated in Figure 50 is adapted for use either in conjunction with high speed web feeding or with slow speed web feeding. The cam has a single high part 266c which extends through a little less than one-tenth of the cam circumference. The remainder of the cam is formed by a continuous low part 267c. This cam is adapted to start a carriage feeding cycle precisely at the beginning of each ten inches of web feed. When the web is fed at high speed, therefore, the timing is corrected after each five carriage cycles, but when the web is fed at low speed it is corrected after each ten carriage cycles. When the cam 254c is provided the counter is geared to count ten for each pin wheel revolution.

The web 3 passes from the pin wheel 5 onto a guide roller 28 (Figs. 4 and 29) and thence to the bed cylinder 6. The guide roller 28 is supported between side plates 35 and 36 (Fig. 8) upon a stationary shaft or tie bar 271, which is secured to the plates 35 and 36 by screws 272. The roller 28 has collars 273 secured upon it by set screws 274, the collars being adapted to serve as side guides for the web and being adjustable lengthwise of the roller. The web, in traveling around the bed cylinder 6, first comes in contact with the roller 31, through which activating liquid is applied to the web for causing it to receive printing impressions from the hectograph ink of the cards.

The web is frictionally driven by the bed cylinder 6 at the peripheral speed of the bed cylinder. After passing the bed cylinder it is rewound onto the take-up reel 7.

The take-up reel 7 is a duplicate of the supply reel 1, so that no detailed description of the take-up reel is thought necessary, and the same reference characters used in describing the supply reel have been applied to corresponding parts of the take-up reel. As a matter of fact, when the web has been completely fed off the supply reel and wound onto the take-up reel, the empty supply reel is transferred into the take-up position, and the full take-up reel is removed from the machine so that the printed web can be cut into patches for use upon envelopes, wrappers, etc.

The take-up reel 7 is supported from an arm 276 (Figs. 5 and 14) which is secured to side frame member 36 by a pair of screws 277. The arm 276 has a bearing support 278, for shaft 8, and is secured to said arm by screws 279. A bracket 280, secured to the arm 276 by screws 281, provides a second bearing support for shaft 8. The shaft 8 is mounted in ball bearings 283 and 284, the ball bearings being mounted in the bearing supports 278 and 280. The bearing 283 is held against a shoulder portion of the shaft 8 by a sleeve 285 which is pinned to the shaft. The bearing 284 is held against a shouldered portion of the shaft 8 by means of a washer 286 and a headed screw 287. Beyond the sleeve 285 the shaft 8 has pinned to it a collar 288 which is adapted to be engaged by the hub portion 212 of the take-up reel. The shaft 8 is threaded at its end for receiving a finger nut 289 whereby hub portion 212 is clamped against the collar 288 for holding the reel in place upon the shaft and for causing the reel to be driven in unison with the shaft.

The take-up reel shaft 282 is driven from a pulley 290 (Figs. 2, 4, 9, 11 and 29) which, in common with the feed roller 18, is fast upon the sheet 168. The pulley 290 is connected through a belt 291 (see Figs. 5 and 14 also) to drive a pulley 292. The pulley 292 is revolubly mounted upon a shaft 293. The shaft 293 has a reduced threaded end portion 294 which is passed through a washer 295 and through the arm 276, being held in place by a clamping nut 296.

A composite gear and clutch member 297 is revolubly mounted upon the shaft 293. The member 297 includes gears 298 and 299 and a clutch member 300, the clutch member 300 being opposed to the pulley 292 through discs 301 of friction material. A thrust bearing 302 is mounted at one side of the gear 298 and a similar thrust bearing 303 is mounted in opposed relation against the opposite side of the pulley 292. A compression coil spring 304 surrounds the shaft 293 to urge the pulley 292 toward the clutch member 300. The spring bears at one side against the thrust bearing 303 and at the opposite side against a collar 305. A finger nut 306 is screwed onto a reduced threaded end 307 of the shaft 293 to bear against the coil spring 304 through the medium of the collar 305 and compress the spring 304 to any desired degree. A pin 308 fast on the collar 305 engages in an axial groove 308a of the shaft 293 to prevent rotation of the collar on the shaft. A leaf spring 309 secured to the collar by screw 310 bears against the periphery of a nut 306 and engages in suitable notches to retain the nut against accidental rotation.

As the parts are shown in Figure 14, the gear 298 is in driving engagement with a gear 311 which forms one element of a composite gear member 312. The composite member 312 also includes a comparatively small gear 313 having an elongated sleeve-like hub portion 314. The gear 311 is secured upon the hub portion 314 with a driving fit. The composite member 312 is shiftable along the shaft 282, being secured in adjusted position by a set screw 315.

The connection as illustrated is designed to drive the shaft 282 at the same rotary speed as the gear member 297. This connection is used with the illustrative reel 7 whose core measures three inches in diameter.

The machine is also adapted to be used with narrower reels whose cores measure only five-eighths inch in diameter. When used for the latter purpose it is desirable to provide an increased rotary driving speed for the shaft 282. In that case the set screw 315 is backed out a short distance to free the composite gear 312, and the composite gear is then slid along to the broken line position illustrated at 312a in Figure 14 to place the gear 313 in mesh with the gear 299. In either case a sufficient rewind speed is made available to assure that the web will be rewound without accumulating slack from the very beginning of the rewinding operation. As the rewinding operation progresses, the diameter of the reel increases. The slip clutch formed by the pulley 292 and the clutch member 300 permits slipping, however, without imposing an objectionably high tension upon the web, so that the web is rewound under tension and at the uniform speed at which it emerges from the bed cylinder.

It has been mentioned that an activating liquid is applied to the web through the roller 31. The activating liquid is supplied from the metallic bottle or container 30 which is formed with a comparatively slender neck portion 317 (Fig. 24) and an out-turned lip 318. A threaded ring 319 surrounds the neck 317 and is adapted to be threaded into a cap 320. The lip 318 is clamped by the threaded collar 319 down against a gasket 321 which bears against an out-turned flange 322 of a cup member 323. The flange 322 rests upon a further gasket 324.

The cup member 323 is formed with a central opening 325 through which the stem 326 of a valve 327 passes. A compression coil spring 328 bears at its upper end against the base of the cup and at its lower end against the upper face of a conical valve body 329 which is unitary with the stem 326. The valve is adapted to seat against the inner edge of the base of the cap 329 when the container 316 with the associated parts thus far described is removed from the machine.

The cap 320 includes a tubular extension 330 having an oblique mouth 331. The tubular extension is adapted to be inserted downward into an elbow fitting 332. When the extension 330 has been fully inserted into the fitting 332 with the cap body 320 bearing against the upper face of the fitting, the lower end of the stem 326 holds the valve body 329 away from the seat provided by the cap 320 so that liquid can flow from the body of the container 316 down through openings 333 of the cup-like member 323 past the valve and into the fitting 332. The fitting is provided with a vent opening 334 so that air may be admitted to the container 31 when the level of the liquid in the fitting 332 falls below the upper extremity of the sloping mouth 331. In other words, a barometric feed is provided in which the level of the free liquid is maintained substantially uniformly at the height of the upper edge of the sloping mouth 331. The fitting 332 has threaded into it one end of a petcock 335.

The fitting 332 is clamped in the upper split end of an angle bracket 336 by means of a clamping bolt 337. One arm of the bracket 336 extends alongside the frame plate 36 and is formed with a vertical slot 338. The angle bracket 336 has an out-turned upper end 339 in which a screw 340 is threaded. The screw is provided with collars 341 which bear at opposite sides against an ear 342 formed on the frame plate 36 to prevent axial movement of the screw. The screw 340 is provided with a knurled head 343 so that the screw may be turned with the fingers to raise and lower the bracket 336 and thereby raise and lower the entire barometric feed structure as desired. The purpose of this adjustment is to change the pressure head of the free liquid relative to the roller moistening mechanism. When a desired adjustment has been secured the bracket 336 is locked in position by means of a screw 344 which extends through the slot 338 and is threaded into the frame plate 36, and whose head bears against the bracket 336 through a washer 345.

The petcock 335 is connected to deliver the liquid through a flexible rubber hose 346 (Figs. 4, 20, 23 and 24). The hose is connected through a nipple 347 to the lower end of a wick holder 348. A wick 349 extends upward out of the holder 348 and has its free end pressed toward the roller 31 by a flexible metallic plate 350. Set screws 351 threaded through the upper end of the wick holder 348 press the plate 350 and the wick 349 toward the roller 31. The feeding of the liquid to the roller 275 is accomplished by the capillary action of the wick 349 but, as has been pointed out, the pressure head of the liquid delivered to the wick may be varied as desired by the adjustment of the screw 343.

The roller 31 is carried upon a shaft 352 which is revolubly mounted in split arms 353. Each arm has its split ends fitted around a rock shaft 354 which is supported in the frame plates 35 and 36. Screws 355 draw the split portions of the arms 353 toward one another to clamp the split arms firmly onto shaft 354. A crank finger 356 fast on the shaft 354 is connected through a tension spring 357 to a stationary pin 358 on the frame plate 35 to urge the shaft 354 in a direction which causes the roller 31 to press against the impression cylinder 6. The wick holder 348 is clamped to the rock shaft 354 by headed screws 359 which are passed through the shaft and threaded into the holder 348 beyond the ends of the wick cavity. The wick, therefore, is caused to bear a uniform relation to the roller 31 at all times.

The crank finger 356 is normally free to be drawn in a clockwise direction (as seen in Figure 20) so that the roller 275 may be pressed against the impression cylinder 6 by the action of the spring 357. When a fresh web is being threaded through the machine, however, it is desirable to cast off the roller 31 and to detain it in castoff position. Provision is accordingly made of a finger operated pin 360 (see Figs. 21 and 22 also) which is slidably mounted in a bore 361 of the frame plate 35, and which is adapted to enter a bore 362 of the crank finger 356. The pin 360 is formed with a long notch 363 into which a plate 364 extends. The plate is secured to the frame plate 35 by a screw 365. The plate 364 is adapted to limit movement of the pin 360 by engaging the ends of the slot 363. The plate 364 also prevents accidental withdrawal of the pin from the bore 361. When the pin is inserted into the bore 362 of the crank finger 356 the left hand end of the slot 363 bears against the plate 364. In this condition of the parts the roller 31 is held away from the impression cylinder 6 against the action of spring 257. When the pin 360 is seized by its knurled head 366 and pulled to the left, the crank finger 356 is freed so that the spring 357 draws the roller 31 over against the cylinder 6.

A collar 367 secured to the shaft 354 by a set screw 368 bears against the frame plate 36. Since the crank finger 356 bears against the frame plate 35 the longitudinal position of the shaft 354 is maintained by the crank finger 356 and the collar 367.

The printing cylinder 25 (Figs. 4, 35 and 36) is urged toward the impression cylinder 6 with spring pressure and may also be cast off to facilitate the threading through of a fresh web 3. The cylinder 25 is rotatively mounted upon a shaft 369 which has flattened ends 370 fitted into slots 371 of rockers 372 are pivotally supported upon the shaft 168 which drives the feed roller 18. They are urged upward by springs 373 which surround rods 374. The rods 374 extend into sockets of the rocker 372 at the upper ends and are held in sockets of rocking levers 375 at their lower ends. The rods 374 do not serve as thrust members, however, but merely as spring guides. The rocking levers 375 are made fast upon a transverse rock shaft 376 which is carried by the frame members 35 and 36.

A screw 377 having a knurled head 378 is threaded through a square block 379. The block has a shank fast in the side plate 35. The screw 377 bears at its lower end against the upper face of the forward arm of one of the rocking levers 375. By turning the screw 377 the upward pressure exerted by the springs 373 against the rockers 372 may be increased or diminished to accordingly vary the printing effect of the cylinder 25.

A shaft 381 has cams 382 secured to it by pins 383 in position to engage downwardly extending arms 384 of the respective rockers 372. A crank handle 385 secured to the shaft 381 may be actuated to rock the shaft for carrying high parts of the cams into engagement with the arms 384. By turning the shaft 381 through substantially 180°, from the position in Figure 4, the rockers may be detailed in a depressed position with the printing cylinder out of engagement with the impression cylinder as shown in Figure 36.

The feed rollers 17 are also disengaged from the feed roller 18 as an incident of this operation and are held disengaged until the crank handle 385 is returned to its normal position. Split arms 386 are clamped on a stationary shaft 387 by screws 388 and pivotally support at their upper ends arms 389 each of which carries a shaft 390 upon which one of the rollers 17 is rotatively mounted. Each shaft 390 carries one of the guide fingers 166a to which it is secured by a screw 390a. The fingers 166a are resilient and yield as in Figure 36 when the rollers 7 are operated in a manner hereinafter described. The arms 389 carry extension fingers or pins 391 which are connected through tension springs 392 with the rockers 372 to urge the rollers 17 down toward the rollers 18. Rods 393 have their opposite ends disposed in sockets of the rockers 372 and in arms 389 but are normally loosely confined and without effect. When the rockers are swung clockwise (as seen in Fig. 4) to move the printing cylinder away from the impression cylinder, to the position in Figure 36, the rods 393 are thrust upward and are caused to rock the arms 389 upward to carry the roller 17 away from the roller 18 and the rollers 17 are held disengaged until the crank arm 385 is restored to its normal position.

It will be remembered that the shaft 232 which is driven from the web through the pin wheel 5 was referred to as having a counter casing 256 fast upon it. The counter is so arranged that it can not be turned backward and can not be disassembled for access to the counter mechanism without destroying the structure. It may be provided in a machine leased and licensed on a piece work basis or on a web footage basis, with assurance that the reported use of the machine will be susceptible of contradiction or vertification by reference to the counter. As shown, the machine is adapted for lease on a web footage basis.

The counter housing 256 comprises a cylindrical member 394 (Figs. 31 to 34) which is closed at one end and open at the other. The housing member 394 is secured upon a reduced end portion 395 of the shaft 232 by means of a key 396 and a nut 397. It will be observed that the casing member 394 is compelled to turn in unison with the shaft 232 and that it cannot be detached from the shaft without unscrewing the nut 397. The open end of the casing member 394 is closed by a cover plate 398, however, in a manner which makes the interior of the casing completely inaccessible.

The cover plate 398 is formed with a circumferential rabbet 399 for receiving the open end of the casing member 394. A plurality of pins 400 are set in radial bores 401 of the cover 398 and are urged outward by compression springs 402 which are mounted in the bores. A flange 403 of the body member 394 has inwardly facing radial recesses 404 provided in it, the recesses corresponding in number and location to the bores 401 and being adapted to receive and fit the pins 400. The cover with the pins and springs in place and the pins compressed to lie flush with the reduced portion of the cover, is thrust into the member 394 as far as it will go. The preliminary orientation of the cover relative to the member 394 is determined by a jig pin 405 which may be carried by the cover 398 and may enter a recess 406 of the member 394. When the cover has been thrust fully home, the pins 400 snap out into the recesses 404. The recesses, being shallow, limit the outward movement of the pins so that the cover becomes inseparably locked to the member 394.

The counter mechanism is secured upon the inner face of the cover 398 before the cover is put into place. A shaft 407 carried centrally by the cover has unitary with it a pinion 408. The shaft extends through a bore 409 formed in a block 410. The block 410 is secured to the cover plate 398 by headed screws 411. The shaft 407 is supported in ball bearings 412 and 413, the ball bearings being mounted in opposite ends of the bore 409 and separated from one another by a spacing sleeve 414. The base 415 of counter casing 416 is secured to one side of the block 410 by headed screws 417. The casing 416 includes a front member 418 which is fitted through a sight opening 419 formed in the housing member 394. The front member 418 includes the usual window opening and transparent closure through which the number wheels (not shown) of the counter may be seen and read.

The counter may be a conventional Veeder counter having decimal number wheels in which an input shaft 420 drives the number wheel of lowest denomination. The shaft 410 has a pinion 421 affixed to it by a set screw 422. The pinion 421 is in mesh with the pinion 408 and is of the same pitch diameter as the pinion 408. The shaft 407 has fast upon it a weight 423 which always hangs down and thus holds the shaft against turning with the counter housing. This causes the pinion 408 to be held against rotation so that the pinion 421 will be caused to rotate about its own axis as an incident of its planetary movement about the shaft 407.

A pawl 424 (Figs. 31 and 32) is pivotally carried on a headed stud 425, which extends into the weight 423 and is fast thereon. The pawl is formed with a notch 426 in its left hand end, as seen in Figure 31. As the parts are viewed in Figure 31, the housing member 394 turns clockwise, carrying a pin 427 with it. At each revolution the pin 427 strikes the lower face of the pawl 424 and cams it aside. Should it be attempted to turn the casing member 394 backward, however, the pin 427 would catch in the notch 426 of the pawl and would force the weight 423 to turn in unison with the housing member 394. This would result in the pinions 408 and 421 turning in unison with one another so that no rotation of the pinion 421 about its own axis would occur. Turning the counter housing backward would not therefore result in any change of the count exhibited by the counter.

A counterweight 428 is secured to the cover member 398 opposite the counter for counterbalancing the counter. The connection of the counterweight to the cover 398 is effected through headed screws 429.

The counter is desirably constructed to count ten for each revolution of the input shaft 420. As illustrated the input shaft 420 makes one revolution for each revolution of the pin wheel shaft 232. Since the pin wheel pulleys are ten inches in circumference, the counter shows the number of inches of web fed. The user of the machine can compute from the counter reading, for billing purposes, the number of addresses printed. By substitution of appropriate gears for the pinion 408 and the gears 421 the counter can be made to count five for each pin wheel revolution. This arrangement is provided with the cam 254a to yield a count of the addresses printed when the web is fed at high speed.

In some circumstances it is not necessary for the spacing of the addresses on the web to be precisely measured and controlled because the address slips will be cut from the web manually. In such a case the user of the web would watch the web and take care to cut between successive addresses. For this kind of service unperforated web may be employed and the pin wheel 5 may be bypassed. Such a setup is illustrated in Figure 30.

In Figure 30 the web 3 is drawn from the reel 1 and is directed over rather than under idler guide roller 4. It is then passed down around guide roller 28 and onto the impression cylinder 6, whence it is delivered to the take-up reel 7. In this instance the take-up reel 7 is driven through gears 299 and 313 rather than gears 298 and 311, in order to provide a relatively faster drive of a take-up reel 7. This higher speed drive of the take-up reel is provided because the reels employed with unperforated tape have cores of considerably smaller diameter than the reels employed with perforated tape.

The other parts of the machine may be the same as in Figure 29, but for the purpose of illustrating the lower speed web drive the connection from the shaft 99 to the shaft 172 has been shown as going through gears 102, 169, 178 and 171, the bore 177 being used rather than the bore 176, as shown in Figure 29.

The setup of Figure 30 is adapted to produce the arrangement illustrated in Figure 28 with the addresses disposed at substantially one inch intervals upon the unperforated tape.

When the pin wheel 5 is bypassed by the tape, as illustrated in Figure 30, the mechanism for arresting the card feeding carriage is disabled so that the friction clutch member 105 is continuously driven. This may be accomplished very readily simply by turning the pin wheel forward manually to locate a notch of the cam carried by the pin wheel shaft opposite the nose 265 of the arm 264. This causes the finger 262 to be withdrawn from the path of the stop 263 and since the pin wheel is not being operated by the tape, the finger 262 remains in its withdrawn position.

We have described what we believe to be the best embodiments of our invention. We do not wish, however, to be confined to the embodiments shown, but what we desire to cover by Letters Patent is set forth in the appended claims.

We claim:

1. A machine for printing addresses on a web of sheet material at predetermined intervals from individual printing cards comprising, in combination, frictional feed mechanism for the web, including an impression cylinder upon which the web runs and upon which it receives printing from the cards, mechanism for driving the web feed mechanism at uniform speed, positively acting, cyclical card advancing mechanism for supplying the cards to the impression cylinder one after another, a friction clutch comprising a constantly operated driving member and a driven member through which the card supplying mechanism is operated, a traveling stop carried by the driven clutch member, a cooperating, reciprocable stop controlling the frictionally driven clutch member and movable between arresting and releasing positions to render the card advancing mechanism idle and active, respectively, and mechanism for controlling said cooperating stop in accordance with the length of web fed, said mechanism being positively driven by the web and acting through the stops to cause the card feeding means to be arrested whenever the card feeding means completes a cycle before a predetermined length of web has been fed and to be restarted when the feeding of such predetermined web length has been completed.

2. A machine as set forth in claim 1 in which web guiding members are included, suitable to provide a web feed path which causes the web to bypass the normally web driven automatic control mechanism for the reciprocable stop, means settable to detain said reciprocable stop in a fixed, totally ineffective condition, so that the card advancing mechanism will be operated without interruption from the continuously operated driving member of the friction clutch, the mechanism being then adapted to print the addresses on the web at uniform intervals subject to such error, if any, as may be introduced by slipping or creeping of the web relative to the frictional web feeding mechanism.

3. A machine for printing addresses on a web of sheet material at predetermined intervals from individual printing cards comprising, in combination, frictional feed mechanism for the web including an impression cylinder upon which the web runs and upon which it receives printing from the cards, mechanism for driving the web feed mechanism at uniform speed, card advancing mechanism for supplying the cards to the impression cylinder one after another comprising a cyclically acting reciprocable card feeder, a friction clutch comprising driving and driven members through which the card feeder is driven, a traveling stop carried by the driven clutch member, a cooperating reciprocable stop controlling the frictionally driven clutch member and movable between arresting and releasing positions, respectively, to render the card feeder idle at the conclusion of a cycle whenever the card feeding cycle is completed prior to the completion of a predetermined web feeding, and to initiate a new operating cycle of the card feeder when such predetermined web feeding has been completed, and stop control mechanism positively driven by the web for moving the stop between its arresting and releasing positions.

4. A machine for printing addresses on a web of sheet material at predetermined intervals from individual printing cards comprising, in combination, frictional feed mechanism for the web including an impression cylinder upon which the web runs and upon which it receives printing from the cards, mechanism for driving the web feeding mechanism at uniform speed, positively acting card advancing mechanism for supplying the cards to the impression cylinder one after another, a friction clutch comprising driving and driven members through which the card supplying mechanism is operated cyclically, a traveling stop carried by the driven clutch member, a cooperating reciprocable stop controlling the frictionally driven clutch member and movable between arresting and releasing positions to render the card advancing mechanism idle and active, respectively, a sprocket driven positively by the web, a cam driven by the sprocket, and stop operating means controlled by the cam to shift the reciprocable stop to releasing position to initiate a card feeding cycle each time that the feeding of a predetermined length of web is completed, and to shift said stop into arresting position before the card feeding cycle is completed and maintain it there for causing the stop to arrest and detain the card supplying mechanism at the end of its cycle until the prescribed measure of web feeding has been completed.

5. A machine for printing addresses on a web of sheet material at predetermined intervals from individual printing cards comprising, in combination, frictional web feeding mechanism, an impression cylinder upon which the web runs and upon which it receives printing from the cards, mechanism for driving said feeding mechanism at uniform speed, cyclically acting card advancing mechanism for supplying the cards to the impression cylinder one after another, driving means including a slip clutch having a continuously operating driving member and mechanism yieldingly operated thereby, and control means to cause a fresh printing card to be supplied by the card advancing mechanism each time that a predetermined length of web has been fed, said control means including a stop movable between an arresting position in which it arrests the yieldingly operated card advancing mechanism at the conclusion of the card advancing cycle, and a releasing position in which it permits a new cycle to be initiated, a sprocket positively driven by the web, a cam driven by the sprocket, and a control connection from the cam to the stop causing the stop to be moved to releasing position each time a predetermined length of web has been fed, and to be returned to arresting position after a card feeding cycle has been initiated, and maintained there until another such predetermined length of web has been fed.

6. A machine for printing addresses on a web of sheet material at predetermined intervals from individual printing cards comprising, in combination, frictional web feeding mechanism, an impression cylinder upon which the web runs and upon which it receives printing from the cards, means for driving said feeding mechanism at uniform speed, cyclically acting card advancing mechanism for supplying the cards to the impression cylinder one after another, driving means including a slip clutch having a continuously operating driving member and mechanism frictionally operated thereby, and control means to cause a fresh printing card to be supplied by the card advancing mechanism each time that a predetermined length of web has been fed, the control means including a stop movable between an arresting position in which it arrests the frictionally operated card advancing mechanism at the conclusion of each card advancing cycle, and a releasing position in which it permits a new cycle to be effected, a sprocket positively driven by the web, a cam driven by the sprocket, the cam having a series of identical operating divisions each constituting an aliquot part of its periphery, and a control connection from the cam to the stop causing the stop to be moved to releasing position each time a predetermined length of web has been fed, and to be returned to arresting position after a card feeding cycle has been initiated, and maintained there until another such predetermined length of web has been fed so that the cam initiates a new card advancing cycle for each cam division passed.

7. A machine for printing addresses on a web of sheet material at predetermined intervals from individual printing cards, comprising, in combination, frictional web feeding mechanism, an impression cylinder upon which the web runs and upon which it receives printing from the cards, mechanism for driving said feeding mechanism at uniform speed, cyclically acting card advancing mechanism for supplying the cards to the impression cylinder one after another, driving means including a slip clutch having a continuously operating driving member and mechanism yieldingly operated thereby, and control means to cause a fresh printing card to be supplied by the card advancing mechanism each time that a predetermined length of web has been fed, the control means including a stop adapted automatically to arrest operation of the card advancing mechanism at the conclusion of the card advancing cycle, a sprocket positively driven by the web, a cam driven by the sprocket, and a control connection from the cam to the stop, the cam having a number of identical operating divisions each constituting an aliquot part of its periphery, and change speed gearing for adjusting the rate of web feed relative to the duration of the card advancing cycle for causing a little less than one cam division to be passed during a cycle in one instance and a little less than two cam divisions to be passed during a cycle in the other instance.

8. A machine for printing addresses on a web of sheet material at substantially predetermined intervals from individual printing cards, comprising, in combination, a main drive shaft, a frictional web feeding mechanism driven uniformly therefrom including an impression cylinder upon which the web runs and upon which it receives printing from the cards, cyclical card advancing mechanism for supplying cards to the impression cylinder one after another, a friction clutch for driving the card advancing mechanism from the main shaft, a stop for engaging and interrupting the operation of the frictionally driving card advancing mechanism to effect a corrective adjustment of timing at the end of a predetermined number of cycles, or a multiple thereof as may be required, and control means for operating the stop to and from arresting position, positively driven by the web, and constructed and arranged to cause a continuous operation consisting of a predetermined number of cycles of the card advancing mechanism, or a multiple thereof, to be initiated after each arresting operation when a predetermined length of web or a multiple thereof, as the case may be, has been fed.

9. A machine for printing addresses on a web of sheet material at predetermined intervals from individual printing cards, comprising, in combination, frictional web feeding mechanism, an impression cylinder upon which the web runs and upon which it receives printing from the cards, means for driving said feeding mechanism at uniform speed, cyclically acting card advancing mechanism for supplying the cards to the impression cylinder one after another, driving means including a slip clutch having a continuously operating driving member and mechanism frictionally operated thereby, and control means to cause a fresh printing card to be supplied by the card advancing mechanism each time that a predetermined length of web has been fed, the control means including a stop movable between an arresting position in which it arrests the frictionally operated card advancing mechanism at the conclusion of a predetermined number of card advancing cycles and a releasing position in which it permits a new cycle to be initiated, a sprocket positively driven by the web, a cam driven by the sprocket, and a control connection from the cam to the stop, the cam having a number of identical operating divisions each constituting an aliquot part of its periphery, constructed and arranged to initiate a continuous operation consisting of a predetermined number of cycles of the card advancing mechanism for each division passed.

References Cited in the file of this patent

UNITED STATES PATENTS

| 1,010,654 | Madden | Dec. 5, 1911 |
|---|---|---|
| 1,026,070 | Boomhower | May 14, 1912 |
| 1,414,103 | Strawn | Apr. 25, 1922 |
| 1,632,433 | Christman | June 14, 1927 |
| 1,833,938 | Elliott | Dec. 1, 1931 |
| 1,997,156 | Tauschek | Apr. 9, 1935 |
| 2,052,632 | Klemm | Sept. 1, 1936 |
| 2,064,989 | Ritzerfeld | Dec. 22, 1936 |
| 2,238,359 | Copeland | Apr. 15, 1941 |
| 2,277,924 | Morrison | Mar. 31, 1942 |
| 2,280,095 | Metzner | Apr. 21, 1942 |
| 2,360,648 | Copeland | Oct. 17, 1944 |
| 2,374,698 | Pechy | May 1, 1945 |
| 2,396,199 | Pfeiffer | Mar. 5, 1946 |
| 2,398,888 | Ford | Apr. 23, 1946 |
| 2,549,607 | Hueber | Apr. 17, 1951 |
| 2,552,869 | Sauerman | May 15, 1951 |
| 2,598,523 | Federwitz | May 27, 1952 |
| 2,615,390 | Sauerman | Oct. 28, 1952 |